United States Patent
Pappu

(10) Patent No.: US 9,485,164 B2
(45) Date of Patent: Nov. 1, 2016

(54) SYSTEM AND METHOD FOR ENSURING SUBSCRIBER FAIRNESS USING OUTLIER DETECTION

(71) Applicant: Sable Networks, Inc., Santa Clara, CA (US)

(72) Inventor: Surya K. Pappu, Milpitas, CA (US)

(73) Assignee: SABLE NETWORKS, INC., Santa Clara, CA (US)

(*) Notice: Subject to any disclaimer, the term of this patent is extended or adjusted under 35 U.S.C. 154(b) by 450 days.

(21) Appl. No.: 13/893,210

(22) Filed: May 13, 2013

(65) Prior Publication Data
US 2013/0304909 A1 Nov. 14, 2013

Related U.S. Application Data

(60) Provisional application No. 61/646,836, filed on May 14, 2012.

(51) Int. Cl.
| | |
|---|---|
| *H04L 12/26* | (2006.01) |
| *H04L 12/24* | (2006.01) |
| *H04L 12/927* | (2013.01) |
| *H04L 12/911* | (2013.01) |

(52) U.S. Cl.
CPC ....... *H04L 43/0882* (2013.01); *H04L 41/0896* (2013.01); *H04L 43/04* (2013.01); *H04L 47/808* (2013.01); *H04L 47/822* (2013.01); *H04L 47/823* (2013.01)

(58) Field of Classification Search
CPC ... H04L 43/04; H04L 47/822; H04L 47/823; H04L 41/0896; H04L 47/808
See application file for complete search history.

(56) References Cited

U.S. PATENT DOCUMENTS

| | | | |
|---|---|---|---|
| 5,014,265 A | 5/1991 | Hahne et al. | |
| 5,067,127 A | 11/1991 | Ochiai | |
| 5,267,232 A | 11/1993 | Katsube et al. | |
| 5,436,886 A | 7/1995 | McGill | |

(Continued)

FOREIGN PATENT DOCUMENTS

EP 2112800 A1 10/2009

OTHER PUBLICATIONS

U.S. Appl. No. 14/792,134 by Pappu, S., et al., filed Jul. 6, 2015.
Extended European Search Report mailed May 28, 2015, for European Patent Application No. 13790644.2, 5 pages.
International Search Report and Written Opinion mailed Aug. 8, 2013, in International Patent Application No. PCT/US2012/025632 filed Feb. 16, 2013.

(Continued)

*Primary Examiner* — Nicholas Taylor
*Assistant Examiner* — Afroza Sultana
(74) *Attorney, Agent, or Firm* — Perkins Coie LLP

(57) ABSTRACT

Various embodiments of the present invention relating to a subscriber fairness solution are disclosed. The subscriber fairness solution contemplates a variety of improved techniques for using a flow-based statistical collection mechanism to monitor subscriber usage across various attributes (e.g., subscriber byte count, flow count, etc.) and maintain subscriber usage information for different time frames. In embodiments, the subscriber fairness solution includes a detection phase and a mitigation phase. In the detection phase, "outliers," or subscribers who are using more than their fair share of network resources, are identified. In the mitigation phase, appropriate action is taken to resolve the constraints on the network resources, caused by these outliers. The subscriber fairness solution may be embodied in hardware, software, or a composite approach of both hardware and software.

37 Claims, 11 Drawing Sheets

(56) References Cited

U.S. PATENT DOCUMENTS

| | | | |
|---|---|---|---|
| 5,467,343 | A | 11/1995 | Lee et al. |
| 5,559,611 | A | 9/1996 | Bloomfield et al. |
| 5,701,291 | A | 12/1997 | Roberts |
| 5,909,440 | A | 6/1999 | Ferguson et al. |
| 5,917,821 | A | 6/1999 | Gobuyan et al. |
| 5,933,425 | A | 8/1999 | Iwata |
| 5,995,503 | A | 11/1999 | Crawley et al. |
| 6,006,264 | A | 12/1999 | Colby et al. |
| 6,072,797 | A | 6/2000 | Fletcher |
| 6,081,522 | A | 6/2000 | Hendel et al. |
| 6,081,524 | A | 6/2000 | Chase et al. |
| 6,195,697 | B1 | 2/2001 | Bowman-Amuah |
| 6,249,519 | B1 | 6/2001 | Rangachar |
| 6,473,400 | B1 | 10/2002 | Manning |
| 6,487,170 | B1 | 11/2002 | Chen et al. |
| 6,574,195 | B2 | 6/2003 | Roberts |
| 6,801,502 | B1 | 10/2004 | Rexford et al. |
| 7,020,082 | B2 | 3/2006 | Bhagavath et al. |
| 7,126,918 | B2 | 10/2006 | Roberts |
| 7,467,225 | B2 | 12/2008 | Anerousis et al. |
| 7,813,356 | B2 | 10/2010 | Roberts |
| 7,854,003 | B1 | 12/2010 | Strayer et al. |
| 8,243,593 | B2 | 8/2012 | Natchu et al. |
| 8,280,968 | B1 | 10/2012 | Duan |
| 8,554,907 | B1* | 10/2013 | Chen et al. ............ 709/224 |
| 9,167,004 | B2 | 10/2015 | Pappu et al. |
| 2002/0032793 | A1 | 3/2002 | Malan et al. |
| 2004/0250124 | A1 | 12/2004 | Chesla et al. |
| 2005/0052992 | A1* | 3/2005 | Cloonan et al. ............ 370/229 |
| 2005/0125195 | A1 | 6/2005 | Brendel |
| 2005/0223089 | A1* | 10/2005 | Rhodes ............ H04L 43/0876 709/223 |
| 2006/0031504 | A1* | 2/2006 | Hegli et al. ............ 709/225 |
| 2006/0206935 | A1 | 9/2006 | Choi et al. |
| 2007/0283436 | A1 | 12/2007 | Duffield et al. |
| 2008/0084977 | A1 | 4/2008 | Nayak et al. |
| 2008/0126538 | A1 | 5/2008 | Uyama et al. |
| 2008/0132257 | A1 | 6/2008 | Fok et al. |
| 2008/0250497 | A1 | 10/2008 | Mullarkey et al. |
| 2010/0100962 | A1 | 4/2010 | Boren |
| 2010/0169475 | A1* | 7/2010 | Woundy et al. ............ 709/224 |
| 2010/0306179 | A1* | 12/2010 | Lim ............ 707/688 |
| 2011/0113009 | A1 | 5/2011 | Gupta et al. |
| 2011/0211465 | A1 | 9/2011 | Farrugia et al. |
| 2011/0264961 | A1 | 10/2011 | Hong et al. |
| 2011/0320607 | A1 | 12/2011 | Harrang et al. |
| 2013/0268664 | A1* | 10/2013 | Lidstrom et al. ............ 709/224 |

OTHER PUBLICATIONS

International Search Report and Written Opinion mailed Aug. 12, 2013, in International Patent Application No. PCT/US2012/040807 filed May 13, 2013.
U.S. Co-Pending U.S. Appl. No. 13/398,597 by Pappu, S., et al., filed Feb. 16, 2012.
Non-Final Office Action mailed Jul. 8, 2013, in U.S. Appl. No. 13/398,597 by Pappu, S., et al., filed Feb. 16, 2012.
"NetFlow Services and Application"; White Paper; Public Copyright © 1999 Cisco Systems, Inc.; pp. 1-27.
Tag Switching; Cisco IOS Technologies; htt://www.cisco.com/warp/public/cc/cisco/mkt/ios/tag/index.shtml; Cisco Systems; Apr. 5, 2000; pp. 1-4.
Cisco—NetFlow Services and Applications; Netflow Services and Applications; wysiwyg://18http://www.cisco.com/warp/public/732/netflow/; Apr. 5, 2000 pp. 1-3.
FlowCollector Overview; http://www.cisco.com/univercd/cc/t.gmt/nfc/nfc_3_0/nfc_ug/nfcover.htm; Apr. 5, 2011 pp. 1-8.
"White Paper—The Need for QoS"; Stardust.com, Inc.; QoSforum.com: A White Paper; Jul. 1999; pp. 1-14.
"Requirements for Traffic Engineering Over MPLS"; http://www.ietf.org/rfc/rfc2702.txt; Apr. 16, 2000; pp. 1-26.
"Specification of Guaranteed Quality of Service"; http://www.ietf.org/rfc/rfc2212.txt?number=2212; Apr. 16, 2000; pp. 1-19.
Resource ReSerVation Protocol (RSVP)—Version 1 Functional Specification; http://www.ietf.org/rfc/rfc2205.txt?number=2205; Apr. 16, 2000; pp. 1-97.
"An Architecture for Differentiated Services"; http://www.ietf.org/rfc/rfc2475.txt?number=2475; Apr. 16, 2000; pp. 1-32.
"Definition of the Differentiated Services Field (DS Field) in the Ipv4and Ipv6 Headers"; http://www.ietf.org/rfc/rfc2474.txt?number=2474; Apr. 16, 2000; pp. 1-18.
"Quality of Service Protocols Use a Variety of Complementary Mechanisms to Enable Deterministic End-to-End Data Delivery"; QoS Protocols & Architectures, QoS Forum White Paper, Stardust.com, Inc.; pp. 1025 (Jul. 8, 1999).
Extended European Search Report mailed May 6, 2015, for European Patent Application No. 12865509.9, filed Feb. 16, 2012.
Notice of Allowanced mailed Apr. 8, 2015, in U.S. Appl. No. 13/398,597 by Pappu, S., et al., filed Feb. 16, 2012.
Final Office Action mailed Jan. 30, 2014, in U.S. Appl. No. 13/398,597 by Pappu, S., et al., filed Feb. 16, 2012.

* cited by examiner

SYSTEM AND METHOD FOR ENSURING SUBSCRIBER FAIRNESS USING OUTLIER DETECTION

CROSS REFERENCES TO RELATED APPLICATION(S)

This patent application claims priority and the benefit of U.S. Provisional Application 61/646,836, entitled "SYSTEM AND METHOD FOR ENSURING SUBSCRIBER FAIRNESS USING OUTLIER DETECTION" filed on May 14, 2012.

This patent application is related to the technologies described in the following patents, all of which are herein incorporated by reference: U.S. Pat. No. 6,574,195 (application Ser. No. 09/552,278), entitled "MICRO-FLOW MANAGEMENT" filed Apr. 19, 2000; U.S. Pat. No. 7,126,918 (application Ser. No. 10/086,763), entitled "MICRO-FLOW MANAGEMENT" filed Feb. 27, 2002; and U.S. Pat. No. 7,813,356 (application Ser. No. 11/533,346), entitled "MICRO-FLOW MANAGEMENT" filed Sep. 19, 2006.

FIELD OF INVENTION

The present invention relates generally to communications systems, and more particularly to a system and method for allocating resource among a plurality of subscribers within a network.

BACKGROUND

User fairness or service fairness associated with resource utilization within a network is a pervasive term in traffic management. Generally, network elements implement a policy of flow fairness on every traffic flow associated with a user, no matter where a particular flow originates. Under the policy of flow fairness, users with a large number of flows and users with fewer flows are treated the same, even during times of network congestion. This can be a problem, for example, in situations with bandwidth-hungry applications, such as peer-to-peer applications, where the users of these applications are allowed to consume a disproportionate amount of resources, more than their fair share of bandwidth, at the expense of other users on the network.

Several fairness models have been utilized as an attempt to address the problems of "resource-hungry" applications in wireline and mobile networks. These models, however, generally place the onus on a system operator to monitor usage patterns of all users in order to set some threshold for detecting users using disproportionate amounts. Further, the monitoring being done by the operator only looks to a limited, one-dimensional view of the user's usage patterns (e.g., byte count).

Therefore, it is desirable to implement a fairness model that accounts for the cost of a user's behavior on other users and provides a more refined method of evaluating and effecting service fairness.

SUMMARY

Various embodiments of the present invention relating to a subscriber fairness solution are disclosed. The subscriber fairness solution contemplates a variety of improved techniques for using a flow-based statistical collection mechanism to monitor subscriber usage of network resources across various attributes (e.g., byte count, flow count, etc.) and to maintain subscriber usage information for different time frames. In embodiments, the subscriber fairness solution includes a detection phase and a mitigation phase. In the detection phase, "outliers," or subscribers who are using a disproportionate amount of network resources, are identified. In the mitigation phase, appropriate action is taken to resolve the constraints on the network resources caused by the identified outliers. The subscriber fairness solution may be embodied in hardware, software, or a composite approach of both hardware and software.

In one embodiment, a system for allocating resource in a subscriber fairness solution comprises a processor, a packet processing module, and a bulk statistics record module. In one embodiment, a method for allocating resource in a subscriber fairness solution comprises monitoring stream data associated with a resource usage of a subscriber on a network, deriving byte data from the stream data, applying an outlier detection logic, assigning a plurality of bands based on the outlier detection logic, assigning an overall usage band based on the plurality of bands assigned, and applying a mitigating action based on the overall usage band assigned. In one embodiment, a method for allocating resource in a subscriber fairness solution comprises aggregating flow data and byte data, applying an outlier detection logic, assigning a plurality of bands based on results of applying the outlier detection logic, and assigning an overall usage band based on the plurality of bands assigned, and applying a mitigating action based on the overall usage band assigned.

Other aspects, elements, features, and steps in addition to, or in place of, what is described above will be apparent from the accompanying figures and detailed description.

BRIEF DESCRIPTION OF THE DRAWINGS

Examples of system and method relating to the subscriber fairness solution according to various embodiments of the present invention are illustrated in the figures. The examples and figures are illustrative rather than limiting.

DETAILED DESCRIPTION

Figure 1:
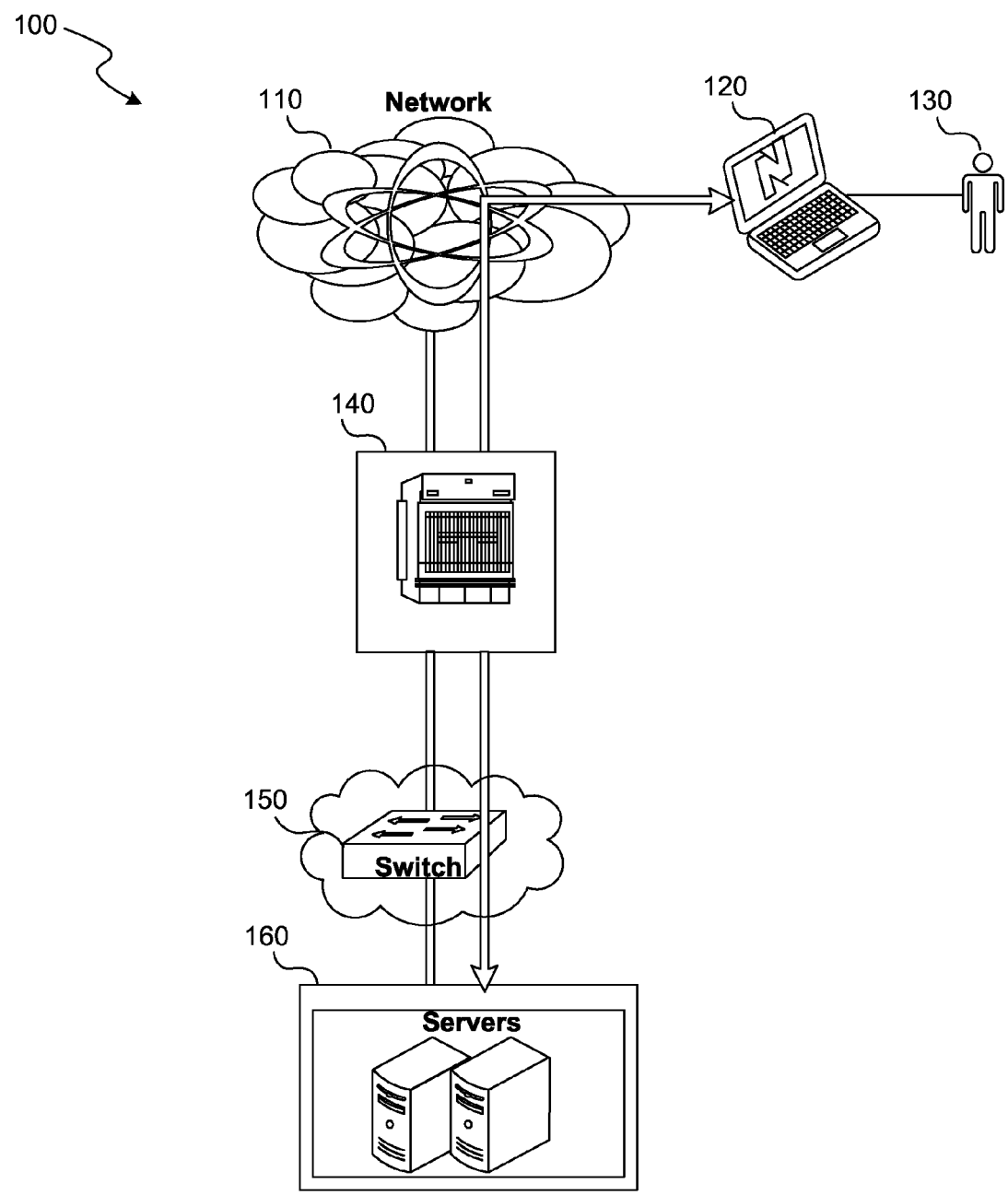
FIG. 1 depicts an example environment in which the system and method for the subscriber fairness solution may be implemented, according to an embodiment.

The following description and drawings are illustrative and are not to be construed as limiting. Numerous specific details are described to provide a thorough understanding of the disclosure. However, in certain instances, well-known or conventional details are not described in order to avoid obscuring the description.

Without intent to further limit the scope of the disclosure, examples of instruments, apparatus, methods and their related results according to the embodiments of the present disclosure are given below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Various embodiments of the present invention relating to a subscriber fairness solution are disclosed. In a network where users share a common channel for flows, imposing a model or criteria to allow for fair allocation of network resources among the users is essential. For example, for situations where the users utilize bandwidth-hungry applications, such as peer-to-peer applications, a huge amount of flows, along with a huge amount of bytes, is generated for each instance of file sharing. Under the traditional policy of flow fairness, the peer-to-peer application users, are allowed to consume a disproportionate amount of resources. These users, who monopolize extra bandwidth, detrimentally impact the quality of experience (QoE) of other users on the same network.

Several fairness models have been utilized as an attempt to address the problems of bandwidth-hungry applications. A common objective among these models is the identification of a class of users called "heavy users." One fairness model identifies heavy users when a particular user's data usage exceeds a predefined threshold. For example, if a user's traffic exceeds 250 gigabytes over a month, the user is deemed a heavy user. This predefined threshold is typically defined by an operator, and is based entirely on measuring the number of bytes used by the user. As such, the onus is on the operator to monitor the usage patterns of all users in order to determine the threshold at which a particular user ought to be classified as a heavy user. Further, monitoring byte usage is only a one-dimensional view of a particular user's usage patterns.

In contrast, the subscriber fairness solution of the present invention ensures user fairness (or "subscriber fairness") using an outlier detection logic that enables a multi-dimensional perspective, while offering the flexibility to support existing fairness models. The subscriber fairness solution comprises an outlier detection phase and a mitigation phase. In the outlier detection phase, a plurality of subscribers who are using a disproportionate amount of network resources (e.g., network bandwidth) are identified using the outlier detection logic. The outlier detection logic utilizes one or more statistical outlier detection algorithms to identify the plurality of subscribers, or "outliers." In the mitigation phase, appropriate action is taken to resolve constraints on the network resources caused by the outliers. The subscriber fairness solution may be embodied in hardware, software, or a composite approach of both hardware and software.

Before discussing further details of the subscriber fairness solution, it is useful to define certain terminology. The terms "user," "subscriber," and "entity" are used herein interchangeably, and each refers to a unit, such as an end-user or a group(s) of end-users, across which subscriber fairness needs to be enforced. For example, an entity is a group of end-users in a small business. In some embodiments, a user (or a subscriber or an entity) can be identified through an IP address. For example, the entity is a group that is identified by its public IP address. In another example, an entity is a group that is identified as having the potential to share a broadband link with other residential and/or small business users. In yet another example, a subscriber is an individual user or a small entity that is identified as belonging to an IP address. The subscriber fairness solution may use the identifier ("ID"), or name, of a particular subscriber to maintain a usage history of a user system accessing the network. In some embodiments, the subscriber's ID or name is internally mapped to a specific IP address. In some embodiments, where the subscriber fairness solution is integrated with an AAA/RADIUS server, the specific IP address for a subscriber's name or ID can be obtained, allowing changes in IP address as the subscriber is not tied to a specific IP address. This internal mapping may be useful, for example, in mobile deployments.

As will be discussed in further detail below, the underlying network environment of the subscriber fairness solution operates on a flow-state basis associated with a plurality of subscribers accessing the network. The term "flow-state" is used herein to refer to information about a particular flow associated with a subscriber utilizing a network resource. The term "flow" as used herein refers to a stream of IP packets going from a particular source IP address and transport layer port to a particular destination IP address and transport layer port, in which all of the packets are using the same protocol (e.g., voice call, video call, file transfer, web access, etc.). As will be discussed in further detail below, the subscriber fairness solution may utilize a flow-state router to route the flows (of IP packets) and maintain state information on every flow traveling through a particular system. The term, "state information" as used herein may include, but is not limited to, forwarding information, Quality of Service (QoS) information, application specific information, and information about traffic type, traffic rate, application, and service needs. In embodiments, the state information may be updated whenever every packet of a particular flow traverses the flow-state router. For additional details, please refer to the '195 patent, the '918 patent, and the '356 patent. (See under "Cross References to Related Applications" for more details).

FIG. 1 and the following discussion provide a brief, general description of a representative environment in which the system and method for the subscriber fairness solution may be implemented, according to an embodiment of the present invention. Use of the term "system" herein may refer to some or all of the elements of FIG. 1, or other aspects of the subscriber fairness solution. Referring to FIG. 1, an example environment 100 comprises a user system 120 coupled via a network (e.g., Internet) 110 to a flow state router 140, a switch 150, and a plurality of servers 160.

The network 110 may include, but is not limited to, an open network, such as the Internet. The network 110 may be any collection of distinct networks operating wholly or partially in conjunction to provide connectivity to the electronic devices. The collection of distinct networks may appear as one or more networks to the serviced systems and devices. In one embodiment, communications over the network 110 may be achieved by a secure communications protocol, such as secure sockets layer (SSL), or transport layer security (TLS). In addition, communications may be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The user system 120 may be any machine or system that is used by a user, subscriber, or entity 130 to access content via the network 110. The user system 120 may be a handheld computing device, a mobile phone, a laptop computer, a work station, a network of computing devices, and the like. For example, a laptop computer is used by the user 130 to access and download media content from a server via the Internet. In embodiments, the subscriber fairness solution may be implemented to ensure subscriber fairness on the network 110 among a plurality of user systems 120.

The subscriber fairness solution may be executed by the flow state router 140. The router 140 provides a view of traffic to the plurality of servers 160 and is adept in resolving issues confined to a specific entity (e.g., a subscriber utilizing a user system on the network). The flow state router 140 may be an infrastructure of hardware, such as one or more line cards (e.g., Sable Network's S-Series line card), that manages flow states associated with the traffic of the plurality of users 130 using the plurality of user systems 120 on the network 110.

In embodiments, when the first packet of a flow associated with a particular subscriber 130 traverses the flow state router 140, a "flow state" is created in a memory of a packet processing module for that flow (i.e., the flow is established at the point in time when the first packet traverses the flow state router). The flow state router 140 then labels the flow with a unique header (e.g., 5-tuple header containing source address and transport layer port, destination address and transport layer port, and protocol type) and creates a unique "flow record" for the flow. The term "flow record" as used herein refers to a record comprising the state information associated with a particular flow. Each flow record's statistics, obtained from the state information, may be combined to form various types of "aggregate data."

The term "aggregate data" as used herein refers to an aggregation of statistics from multiple flow records that match a certain classification criteria. For example, all flow records with a matching source address ("SA") are aggregated to be a part of the SA aggregate. In this example, the SA aggregate contains cumulative statistics from all flows with the matching SA. In another example, all flow records with a matching destination address ("DA") are combined to form the DA aggregate. In such example, the DA aggregate contains cumulative statistics from all flow records with the matching DA. Other aggregates that use a combination of address and transport layer port, such as SA and transport source port, are also possible. Once aggregates are created by accumulating matching flow records together based on a certain classification criteria (SA, DA, or other), various attributes can be used to maintain the aggregate data.

The term "attributes" as used herein refers to various statistical metrics recorded in the flow records that reflect a subscriber's usage pattern. For example, an attribute is a byte count associated with a particular subscriber (e.g., the number of bytes used by the subscriber). In another example, an attribute is a flow count associated with the particular subscriber (e.g., the number of flows observed for that subscriber). In yet another example, an attribute is a packet count associated with the particular subscriber.

In embodiments, whenever a subsequent packet of the flow (i.e., not the first packet of the flow) traverses the flow state router 140, the flow state router 140 updates the flow record accordingly. As discussed above, the flow state that is being updated is initially created when the first packet of the flow traverses the flow state router 140.

The flow state router 140 may, in accordance with some embodiments, operate differently in comparison to traditional routers well-known in the art. For example, while traditional routers perform routing table lookups on every packet and forward every packet that is individually encountered, the flow state router may perform one look-up for the first packet of a new flow, save the result (i.e., flow state) in a flow record, and process all subsequent packets of the flow in accordance to specific policies, application needs, control parameters, assigned QoS profiles, or other guidelines saved in the flow record without incurring additional look-ups. In addition, flow state information for each flow may be redirected to an internal or external device for further monitoring, logging, and analysis. It is noted that all such flow information is the most accurate snapshot of traffic passing through the flow state router.

In some embodiments, the flow state router 140 may additionally apply a specific treatment or mitigation action to the entire flow (i.e., every packet in the flow) based on a classification, rule, or policy, etc. In these instances, the flow-state router reserves the appropriate resources needed to apply the policy so as to guarantee the resources' availability for subsequent packets in the flow.

Figure 2A:
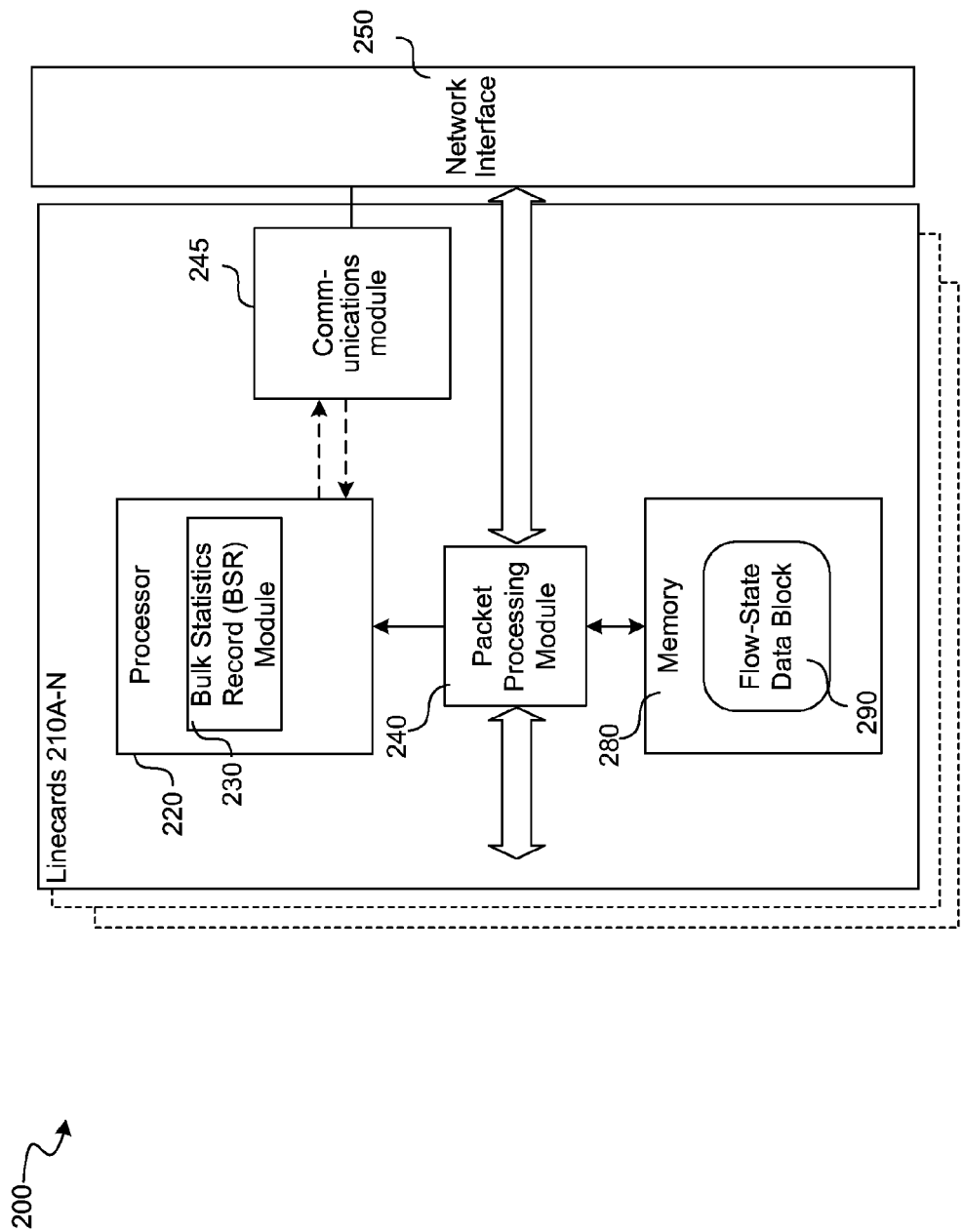
FIG. 2A depicts a block diagram illustrating an example system for ensuring subscriber fairness, according to an embodiment.

FIG. 2A depicts a simplified block diagram illustrating a system 200 for ensuring subscriber fairness, according to an embodiment of the present invention. The system 200 may operate within the flow state router 140 of FIG. 1. In the embodiment, as illustrated in FIG. 2A, the system 200 comprises hardware and software to detect and mitigate heavy usage subscribers. However, this combined hardware and software configuration is solely illustrative of an example embodiment and does not limit the invention to this specific implementation. It is noted that the term "ensuring" refers to reallocating network resources such that no subscriber is using such a disproportionate amount of resource(s) that detrimentally impacts the QoE of other users on the same network. As such, ensuring subscriber fairness, as used herein, does not necessarily mean guaranteeing that every subscriber on the network is using an exact equal share of resources.

As illustrated in FIG. 2A, the system 200 may be an infrastructure of hardware, such as one or more line cards 210A-N (e.g., Sable Network's S-Series line card) for maintaining the flow states of a plurality of flows (e.g., millions of flows from the plurality of subscribers). Each line card 210 comprises a communications module 245, a bulk statistics record (BSR) module 230 executed by a general purpose processor 220, a packet processing module 240 with associated functions (including traffic classification, forwarding, and QoS) which can be executed by software or hardware, a memory module 280 configured to store one or more flow-state data blocks 290. (See related patents under "Cross References to Related Applications" for more details). A network interface 250 enables the line card 210 to mediate data in a network with an entity that is external to the line card, through any known and/or convenient communications protocol supported by the line card and the external entity. The network interface 250 may be one or more networking devices, and may encompass one or more of a network adaptor card, a wireless network interface card, and the like.

The line card 210 includes multiple modules and/or components that may be coupled to one another, and each is illustrated as being individual and distinct. However, in some embodiments, some or all of the components, and/or the functions represented by each of the components can be combined in any convenient and/or known manner. For example, the modules of the line card 210 may be implemented on a single device, multiple devices, and/or in a distributed fashion. Thus, the blocks/modules of the line card 210 are functional units that may be divided over multiple devices and/or processing units or combined on a single device. Furthermore, the functions represented by the blocks/modules can be implemented individually in hardware, software, or a combination of hardware and software. Different and additional hardware modules and/or software agents may be included in the line card 210 without deviating from the spirit of the disclosure.

The communications module 245 may be one communications module or a combination of communications modules communicatively coupled to the network interface 250 to manage a one-way, two-way, and/or multi-way communication sessions over a plurality of communications protocols. In one embodiment, the communications module 245 transmits and/or receives data (e.g., information, commands, requests, and/or messages) over a network. Since the communications module 245 is typically compatible with receiving and/or interpreting data originating from various communication protocols, the communications module 245 is able to establish parallel and/or serial communication sessions with operators of remote client devices for data and command exchange (e.g., alerts and/or operator commands).

The packet processing module 240 maintains individual flow state by monitoring a stream of IP packets. As will be discussed in further detail in FIG. 2C, by operating on a flow-state basis, the packet processing module 240 processes flow record data for every individual stream of IP packets, or flow. The packet-processing module 240 periodically exports the flow record data to the BSR module 230. The BSR module 230 harvests the flow record data received from the packet-processing module 240 and creates the aggregate data based on Source Address ("SA"), Destination Address ("DA"), protocol or any other combination of fields from the packet header, for further analysis.

In one embodiment, the packet processing module 240 is a custom packet processing application specific integrated circuit (ASIC), which provides a plurality of periodic flow record samples (i.e., up-to-date flow state information at a given time) of a particular flow, in the form of flow record data, to the BSR module 230. For example, for each flow, the packet processing module 240 provides periodically different types of flow record samples, such as a "first sample," which is sent when the flow is first created, a "middle sample," which is statistically chosen from the flow when the flow is still active (e.g., a middle sample is sent when every Nth packet of a flow is received), and a "close sample," which is a final or summary sample when the flow ends or ages out. Each flow record sample sent to the BSR module 230 contains information from the one or more flow state data blocks 290 maintained, and is updated by the packet processing module 240. The flow record samples are, therefore, sent to the BSR module 230 for each and every flow through the system 200. These flow record samples are used to create accurate aggregate data by the BSR module 230.

Figure 2B:
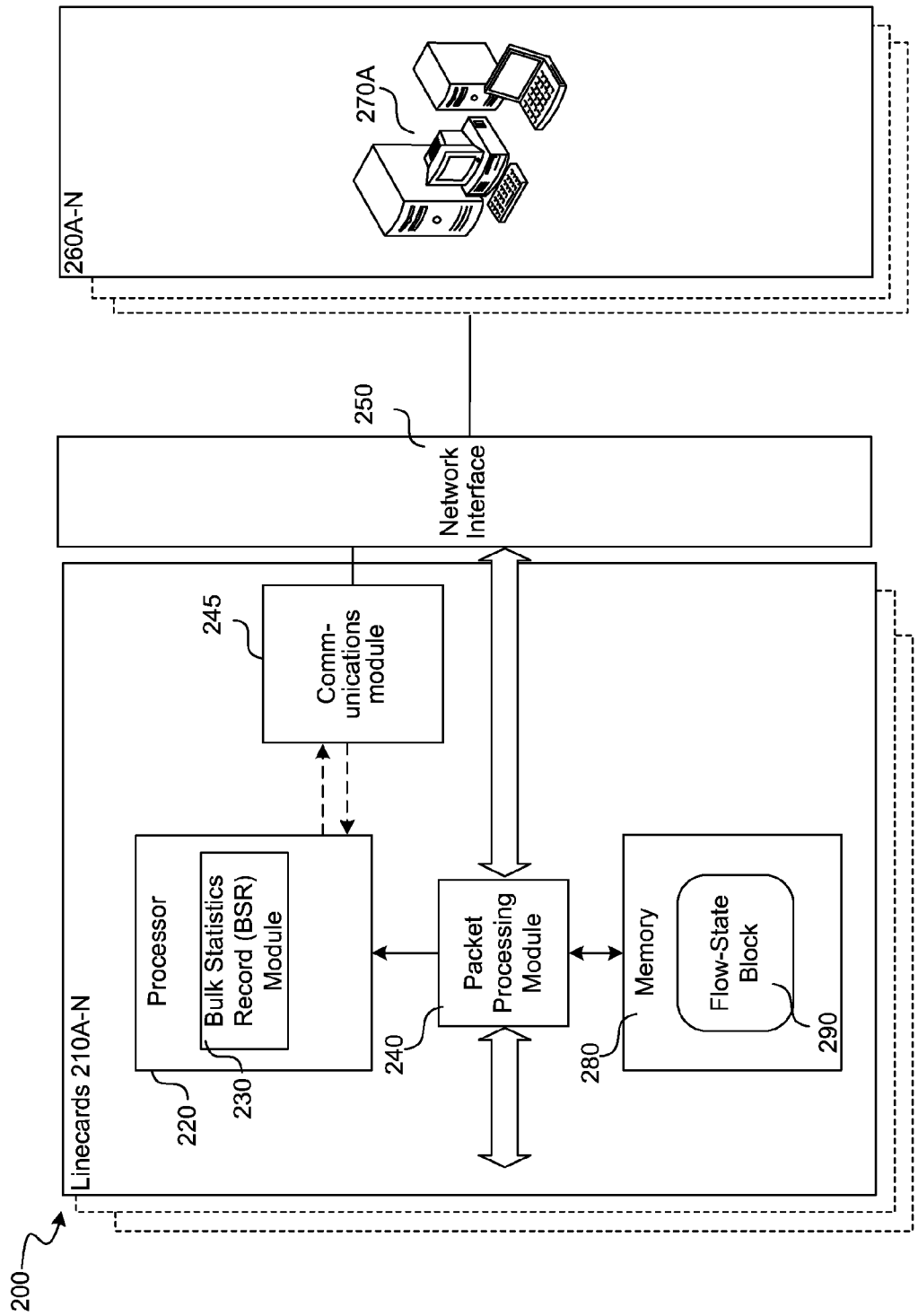
FIG. 2B depicts a block diagram illustrating another example system for ensuring subscriber fairness, according to an embodiment.

FIG. 2B illustrates another embodiment of the system 200. In accordance with the embodiment illustrated in FIG. 2B, the one or more line cards 210A-N are communicatively coupled, via the network interface 250, to one or more external apparatuses 260A-N including software 270A-N.

The one or more external apparatuses 260A-N may be one or more hardware, such as one or more servers. For example, the one or more server(s) may be implemented using one or more processing units, such as server computers, UNIX workstations, personal computers, and/or other types of computers and processing devices. In one embodiment, the server includes multiple components and/or devices that may be coupled to one another and each is illustrated as being individual and distinct. However, in some embodiments, some or all of the components, and/or the functions represented by each of the components can be combined in any convenient and/or known manner. Thus, the components of the server(s) are functional units that may be divided over multiple devices and/or processing units. Furthermore, the functions represented by the devices can be implemented individually or in any combination thereof, in hardware, software, or a combination of hardware and software. Different and additional hardware modules and/or software agents may be included on the server(s) without deviating from the spirit of the disclosure.

The software 270A-N may be implemented on the external apparatuses 260A-N, such as the one or more servers. In one example, the software is the Sable Network's Service & Application Vision [SAVi] software, that is executed by the one or more servers for monitoring and analyzing individual flows or aggregate data associated with the plurality of subscribers accessing the network 110. In some embodiments, the software 270A-N is partially or wholly internal to the one or more external apparatuses 260A-N. For example, some functionalities of the BSR module, such as receiving flow record samples, may be executed by software internal to the system 200 while the remaining functionalities, such as harvesting of data to form aggregates, may be executed by the software 270A-N internal to the external apparatuses 260A-N. In other embodiments, the software 270A-N is fully integrated with the external apparatuses 260A-N coupled to the system 200. For example, the functionalities of the BSR module may be executed entirely on the external apparatuses 260A-N. In yet other embodiments, as discussed in FIG. 2A, the functionalities of the BSR module may be executed entirely by software internal to the system 200, without the external apparatuses 260A-N.

Figure 2C:
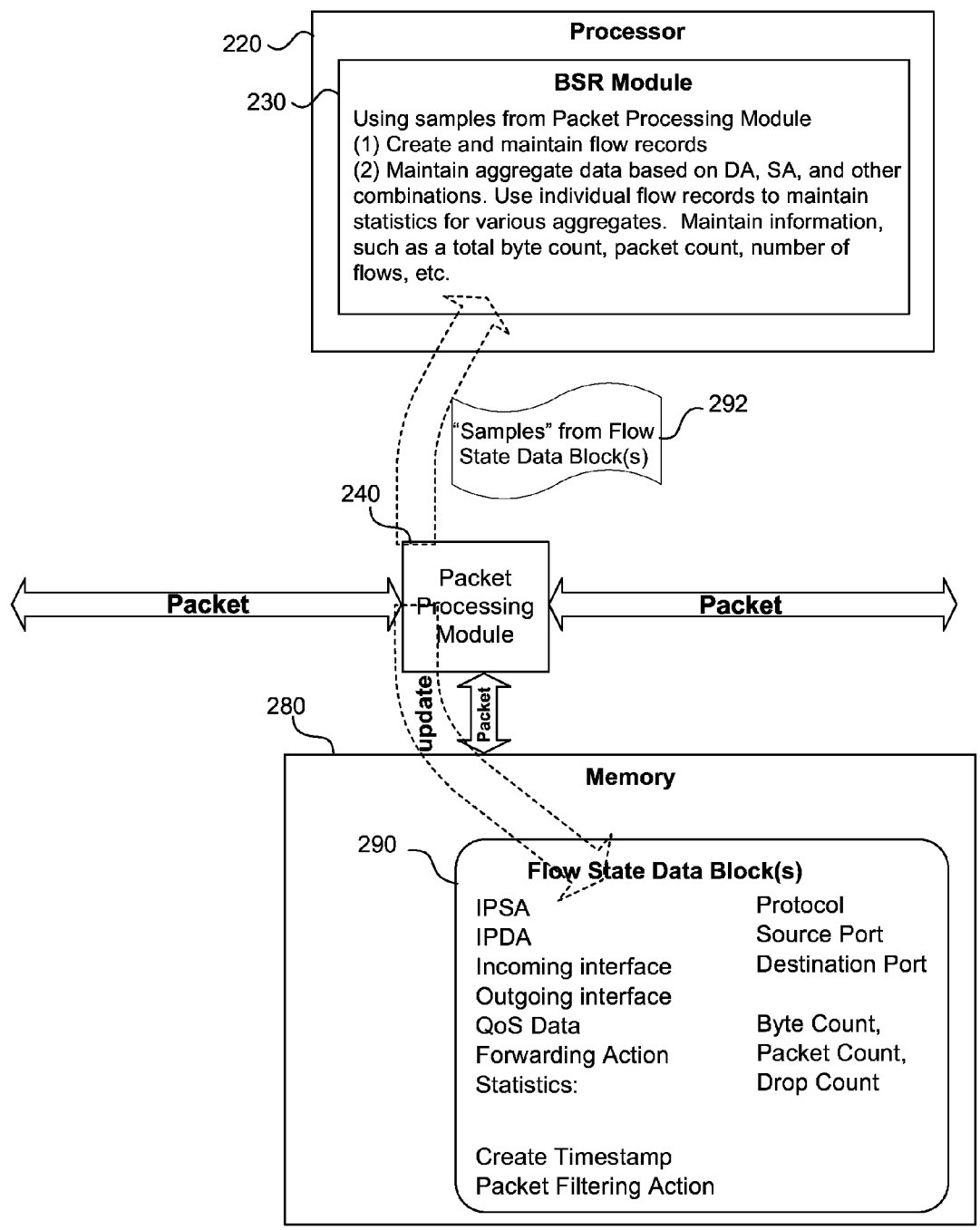
FIG. 2C depicts a block diagram illustrating example detailed processes of the BSR module, the packet processing module, and the one or more flow state data blocks of the subscriber fairness system, according to an embodiment.

FIG. 2C depicts a block diagram illustrating example detailed processes of the BSR module 230, the packet processing module 240, and the one or more flow-state data blocks 290 included in the memory 280, according to an embodiment of the present invention. FIG. 2C shows samples 292 coming directly from the one or more flow-state data blocks 290 to the packet processing module 240. Notably, in a preferred embodiment, the "samples" referred to herein are accurate flow-state data sent periodically, and are not statistically-sampled packets. As will be discussed in further detail below, these samples are sent by the packet processing module 240 to the BSR module 230, which is executed by the processor 220. The BSR module 230 maintains individual flow records and filtered aggregate records (i.e., filtered into categories based on DA, SA, etc.) according to the samples received.

The line card 210, as shown in FIGS. 2A and 2B, comprises the memory 280 which includes the one or more flow-state data blocks 290, as illustrated in FIG. 2C. The one or more flow-state data blocks 290 maintain the state information associated with a particular flow on the network. The flow state (i.e., state information) is created and updated as packets belonging to the particular flow are received by the packet processing module 240. The state information that may be stored in the one or more flow state data blocks 290 may include, for example, IPSA, IPDA, incoming (i.e., ingress) interface, outgoing (i.e., egress) interface, quality of service (QoS) data, forwarding action, packet filtering action, flow timestamp creation (i.e., creation of timestamp when the first packet of a flow has been received), statistics (e.g., byte, packet, or drop count), protocol, source port, destination port, and the like.

The samples 292 may represent the first, middle, and close samples discussed above in the description of FIG. 2A. The samples 292 provide information on a plurality of flows (i.e., flow state record data), and may contain the following information: flow keys to identify the flow such as source IP address; destination IP address; source port number; destination port number; IP protocol; egress and ingress interface information; flow statistics such as cumulative number of packets in flow forwarded until that sampling instance; cumulative number of bytes in flow forwarded until that sampling instance; cumulative number of packets dropped until that sampling instance; and Quality of Service (QoS) data that includes jitter, flow rate, packet arrival/departure timestamps, etc.

The packet processing module 240 sends the samples 292 to the BSR module 230. The BSR module 230 accumulates the received samples to create continuous flow records and aggregate records (e.g., to create aggregate records for every DA, SA, etc.) The BSR module 230 then monitors various attributes of the aggregate records (or other similar records towards the server) in a set period of time. The BSR module 230 then operates on these various attributes using an "outlier detection logic." "Outlier detection logic," as used herein refers to a logic utilizing a variety of statistical outlier detection algorithms to detect, or identify, "outlier(s)" on the network. As discussed, the outlier(s) are subscriber(s) who exhibit abnormal usage of network resources (e.g., utilizing a disproportionate amount of network resources).

Before discussing further details of the outlier detection logic, it is useful to define the term "outlier" as used herein. In the traditional field of statistical sampling, the term "outlier" is used for referring to an observed data point that appears to deviate markedly from other observed data points in a particular sample. Because outliers can negatively affect data analyses, the detection, identification, and handling of an outlier is significant in ensuring accurate results in data analysis. In the scientific community, detection of outliers is important for identifying bad data and for evaluating the scientific techniques used if there exists a lot of outliers. Bad data in the statistical sample may be due to an experiment not being correctly implemented. The bad data may also indicate some unknown random variation. As such, under traditional applications, the outliers are detected and then discarded from the data analyzed in order to ensure accurate results.

The term "outlier" as used herein has a completely different application from its traditional use. The outliers detected in the subscriber fairness solution of the present invention are retained (as opposed to being discarded) in order to allocate network resources among the subscribers, such that no subscriber is using a disproportionate amount of network resources. This is so because, in the context of subscriber fairness, data samples collected within a communications system (i.e., the subscriber's usage data) are already as accurate as they can get. The outliers in these samples provide an indication of potentially abnormal usage patterns of some subscribers among the plurality of subscribers on the network. The outliers identified, using the fairness detection logic, are those subscribers who are using a disproportionate amount of network resources. As will be discussed in further details below, the subscriber fairness solution assigns to these outliers "usage bands" for designating them as "heavy users" or "super-heavy users." In some embodiments, the subscriber fairness solution comprises applying a mitigating action to these outliers based on the usage bands in order to ensure subscriber fairness.

As will be discussed in further details below, the BSR module 230, in accordance with an embodiment, executes the fairness detection logic by running one or more statistical outlier detection algorithm(s) based on different subscriber attributes, across different time periods, and at different levels of granularity. In some embodiments, the BSR module 230 may perform additional features peripheral to applying the outlier detection logic, such as providing periodic reports of flow or aggregate records to other modules.

It is noted that executing the outlier detection logic on the BSR module 230 does not degrade the forwarding performance or processing capabilities of the packet processing module 240, since the detection is not occurring in the main data path of the packet processing module 240. In one embodiment, the BSR 230 harvests flow data for only interested flows using classification/filtering criteria, thus conserving bandwidth between the packet processing module 240 and the BSR 230. Moreover, in order to monitor subscriber usage and detect potential congestion caused by heavy users, the BSR module 230 harvests statistics from the subscriber usage at different levels of granularity. The statistics, as will be discussed in further detail below, are harvested from flow state samples obtained from the packet processing module 240. The different levels of granularity at which the statistics are harvested may include, for example, interface (e.g., the network interface 250), Source Address ("SA"), and Destination Address ("DA"). It is noted that while the techniques described herein refer primarily to the DA or SA aggregate level, one skilled in the art will understand that the techniques may be practiced in other ways, such as harvesting data using various other aggregates (e.g., source address and transport source port combination, destination address and destination transport port combination, etc.).

Figure 3A:
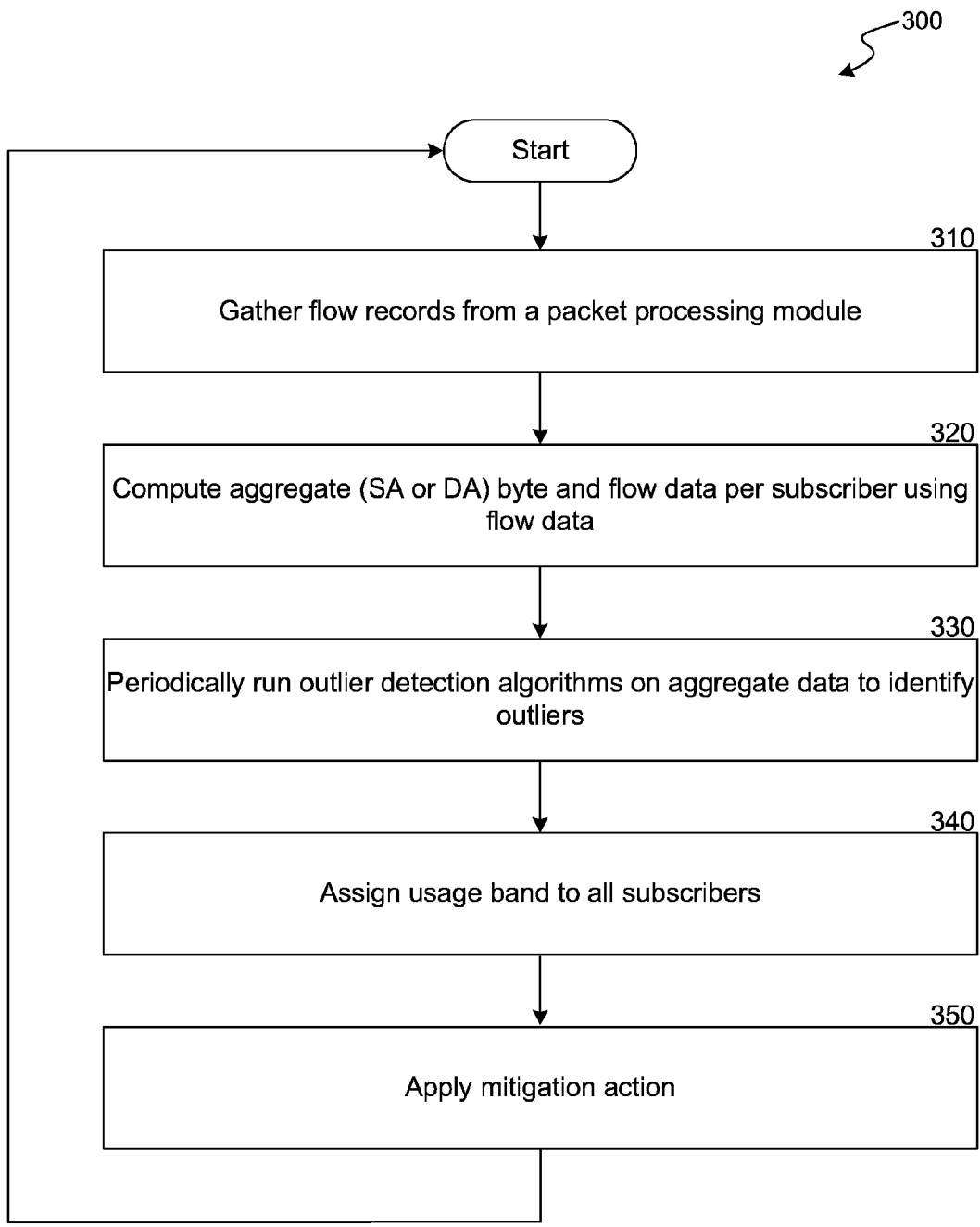
FIG. 3A depicts a flow diagram illustrating an example process for ensuring subscriber fairness, according to an embodiment.

FIG. 3A depicts a flow diagram illustrating an example process for ensuring subscriber fairness by detecting outliers using an outlier detection logic, according to an embodiment of the present invention. The process begins at step 310, whereby flow records are gathered from a packet processing module of the subscriber fairness system. As previously described above, the packet processing module collects individual flow data by monitoring a stream of IP packets so that individual flow record data and aggregate data may be generated.

At step 320, the subscriber fairness system aggregates byte and flow data per subscriber using individual flow data associated with each subscriber. As previously discussed, the cumulative attributes (e.g., aggregated bytes, aggregated flows, etc.) may be tracked to form various types of aggregate data per subscriber. This tracking of aggregate data provides a usage history for a particular subscriber. A subscriber's usage history may be maintained for different time periods. The intervals of these time periods may vary from "very short term," "short term," "medium term" to "long term." For example, a short term history may be defined as any time between fifteen minutes and an hour, and a long term history may be defined as a 24-hour period. As another example, a very short term history may be fifteen minutes, a short term history may be an hour, a medium term history may be one day, and a long-term history may be one week. The usage history interval may be configured by the operator.

In embodiments, when monitoring a subscriber's usage history, the subscriber fairness system tracks a number of various attributes for greater clarity. In one embodiment, the subscriber fairness system tracks the number of flows seen by the subscriber in addition to the number of bytes accumulated. This multi-dimensional tracking enables greater clarity in the determination of outliers. As will be discussed further in FIGS. 4A and 4B, advantages of the multi-dimensional technique are evident when compared to tracking only individual attributes. An example graphical depiction of tracking distribution of the bytes accumulated and of distribution of the flows observed per subscriber will be discussed in FIGS. 4A and 4B, respectively.

At step 330, the system executes an outlier detection logic to identify existence of any outlier(s). In particular, the system runs one or more statistical outlier detection algorithm(s) on subscriber aggregate data to identify the outlier(s), that is, any heavy or super-heavy users utilizing a disproportionate amount of network resource. Based on subscriber's usage patterns for different time frames, the one or more statistical outlier detection algorithm(s) are applied to the statistical distribution for each time frame in order to determine the subscriber entities at the tail end of a distribution, that is, to determine the outliers. In embodiments, these outliers are categorized as "heavy users" or "super heavy users," based on various attributes. To corroborate the identification of these outliers, subscriber aggregate data is correlated across the various attributes, such as the number of used bytes and the number of observed flows. Based on the subscriber statistical distribution for each attribute (e.g., number of bytes, number of flows, etc.), the subscriber is assigned to a specific usage band (as will be discussed in step 340).

Before discussing further details of the statistical outlier detection algorithms, it is useful to have a preliminary overview. Generally, in analyzing a data set, a statistical measure of "central tendency" is calculated as an attempt to describe the data set. The measure of the central tendency is a single "typical" value that identifies the central position of the data set. For example, the average, or mean, of a data set is typically the measure of the central tendency. Note that there are other measures of the central tendency, such as the median and the mode. Each of these measures is calculated differently, and some measures of the central tendency are more appropriate than others. As such, the optimum metric often depends upon the needs of a particular application.

In one example, the median may be the preferred measure of central tendency in an embodiment of the present invention that accounts for both the byte and flow-usage distributions of subscribers. One reason for this preference is that the statistical distribution of subscriber usage is typically not symmetrical, as it is in normal, Gaussian distributions. Using the median value, the fiftieth-percentile data point for the data set can be defined. The median is also a preferred metric because, unlike the mean, it does not have as great a tendency to be skewed by data from outlier(s) (e.g., heavy or super heavy users). In turn, the median value, relative to some measures of central tendency, is less susceptible to distortion by extreme values caused by outlier data.

It is noted that while byte count is most commonly used to define a particular subscriber's usage, the one embodiment of the present invention uses both the byte count and the flow count. In other embodiments, the packet counts may be utilized as well, in addition to the byte count and the flow count, in the analysis of the subscriber's usage. For each of the attributes accumulated, the outlier detection logic, including one or more statistical outlier detection algorithms, is applied to the data to determine existence of any outlier(s) on the network. For example, one or more statistical outlier detection algorithms are applied, to the data accumulated based on byte count separately, and again, the one or more algorithms are applied to the data accumulated based on flow count.

In embodiments, a variety of statistical outlier detection algorithms may be used to identify the outlier(s), including, but are not limited to: standard deviation (SD) algorithm; Z-score algorithm; modified Z-score algorithm; Tukey's algorithm ("boxplot"); adjusted boxplot algorithm; $MAD_e$ algorithm; and the like. It is noted that each statistical outlier detection algorithm has its own advantages and disadvantages. As such, to eliminate any bias towards the methodology employed in specific outlier detection logic, one technique of the subscriber fairness solution contemplates utilizing a combination of statistical outlier detection algorithms (e.g., two or more algorithms) with a certain weight attached to each algorithm. For example, the weight may be based on the accuracy, or some other criteria. In other embodiments, the combination of statistical outlier detection algorithms may be utilized without assigning a certain weight (e.g., every algorithm carries the same weightage of "0").

The following detailed description of the statistical outlier detection algorithms, which are well-known by those of ordinary skill in the art, is not intended to be comprehensive or to limit its implementation to the precise form disclosed. Only a small sample of the statistical outlier detection algorithms is presented for purposes of illustrating the various embodiments of the present invention. Moreover, aspects of each algorithm may be implemented in whole or in part in the various embodiments of the present invention.

In one embodiment, simple percentile thresholds on sorted data sets of subscriber usage distribution may be used to identify outlier(s) in a subscriber usage distribution. The median data point will serve as a measure of the fiftieth percentile in subscribers' byte and flow-usage distributions and thus, may be used to define certain internal thresholds. For example, data points above the eightieth-percentile may be defined as the threshold of "super heavy users." Data points below the eightieth-percentile of the distribution, but above the sixtieth percentile, may be defined as "heavy users." Further, data points below the sixtieth percentile may be defined as "average" and "below average users." In one embodiment, these percentile thresholds for each usage band may be hard-coded, or may be dynamically set, calibrated, and/or adjusted by computing the standard deviation (e.g., mean standard deviation, median standard deviation, etc.). Advantageously, as implemented according to the various embodiments, very minimal configuration is necessary because there is no onus on the operator to monitor all users to define the thresholds, as statistical methods are used to identify those outliers.

In one embodiment, the modified Z-score algorithm that may be used to identify outlier(s) in a subscriber usage distribution. Given a data set X, X' is a sorted arrangement of data for all subscribers, where X is a data set of attributes (e.g., of subscriber bytes or subscriber flows, etc.), and $X' = \{x_0, x_1, \ldots, x_{n/2-1}, x_{n/2}, x_{n/2+1}, \ldots, x_n\}$ where $x_i \leq x_j$ for all $i \leq j$. The median can then be calculated, wherein $x_m = \text{MEDIAN}(X')$ for $i=0$ to $i=n$. Next, the algorithm calculates the absolute value of the difference between the observations and the median, or $X'' = \text{ABS}(x_i - x_m)$. This result is sorted, and subsequently, the median of the absolute deviation about the sample median is calculated, that is, $\text{MAD}_e = \text{MEDIAN}(X'')$ for $i=1$ to $i=n$. Finally, the modified Z-score for the subscriber is calculated as $z_i = 0.6745 * (x_i - x_m)/\text{MAD}_e$. By comparing the modified Z-score to a statistical outlier standard threshold (e.g., $z_i > 3.5$, where 3.5 is the standard statistical outlier threshold value), the outlier detection algorithm can distinguish between an outlier and a "normal" data point.

In one embodiment, a boxplot algorithm may be used to identify outlier(s) in a subscriber usage distribution. Given a data set of X, X' is a sorted arrangement of data for all subscribers, where X is a data set of attributes (e.g., subscriber bytes or subscriber flows, etc.), and $X' = \{x_0, x_1, \ldots, x_{n/2-1}, x_{n/2}, x_{n/2+1}, \ldots, x_n\}$ where $x_i \leq x_j$ for all $i \leq j$. Next, the interquartile range (IQR), between the upper quartile (Q3) and lower quartile (Q1), and equal to Q3−Q1, is calculated, wherein the lower quartile (Q1) is equal to $x_{n/4}$, the median quartile (Q2) is equal to $x_{n/2}$, and the upper quartile (Q3) is equal to $x_{3n/4}$. Based on the IQR, the inner fences can be calculated, wherein $\text{Fence}_{from} = Q1 - 1.5*IQR$ and $\text{Fence}_{to} = Q1 + 1.5*IQR$, with the Inter fences being [Q1−1.5*IQR, Q3+1.5*IQR] and the Outer fences being [Q1−3*IQR, Q3+3*IQR]. Data points beyond the inner fences, but within the outer fence limits, are considered mild outliers. Those beyond the outer fences are considered the full outliers.

At step 340, the subscriber fairness system assigns a usage band to all subscribers on the network based on the outlier(s) identified by the outlier detection logic. As used herein, the term "usage band" refers to a spectrum of varying degrees of usage associated with a particular subscriber, or user, of the network. The usage band may include, for example, "super-heavy users," "heavy users," "average users," and "below-average users" spread across the spectrum. The usage band designates the extent to which a particular subscriber utilizes network resources, based, at least in part, on the subscriber's usage pattern. The usage bands associated with the subscribers on the network are determined by (i) analyzing each subscriber's usage with regards to the individual attributes (e.g., byte count and flow count) and (ii) applying the outlier detection logic on the data set. It is noted that, in other embodiments, other attributes, such as packet count, may be used in the analysis.

In accordance with one embodiment, four usage bands are defined in the process. The four usage bands may include, for example, a "below average" band, an "average" usage band, a "heavy" usage band, and a "super-heavy" usage band. For example, a particular user (or subscriber) may be assigned the below-average usage-band (i.e., below average user) if the user's very infrequent usage contributes to a very small fraction of the overall network bytes or flows. The user may be assigned the average usage-band if the user's usage represents a bulk of the user's traffic pattern with respect to an attribute (e.g., bytes, flows, or packet counts, etc.). If the usage is more than that of a typical user, then the user may be assigned the heavy usage-band for that attribute. If the usage contributes to a network resource strain, the user may be assigned the super-heavy usage-band. A cumulative (i.e., "final" or "overall") usage-band may be determined for the user by analyzing the user's individual usage bands with respect to the individual attributes. For example, a user, having been assigned a super-heavy usage-band with respect to flow count and a super-heavy usage band with respect to packet count, is assigned a super-heavy overall usage-band.

At step 350, after the system determines the overall usage-band of the user, the system may apply a mitigating action. The mitigating action is based, at least in part, on the overall usage band designation. Moreover, the usage history of a subscriber and statistical distribution may be used to determine which type of users to penalize (i.e., "target users"). After identifying the target users, a mitigating action may be configured to determine what actions should be taken on such users. For example, if the target users are configured to be heavy or super-heavy users, no mitigating action is taken if the overall usage-band designation is below-average.

The mitigating action taken by the subscriber fairness system may be based on other configuration preferences. For example, at the end of every time interval (e.g., a short term, medium, or long term period), a mitigating action taken if a the heavy (or super-heavy) users is identified. Further, the mitigating action may be configured to proactively or reactively mitigate the congestion. Proactive mitigating action may be taken when no resource strain has yet been detected, and when the statistical distribution has merely identified several heavy users/outliers. Reactive mitigating action may be taken when the link is actually congested or nearing capacity.

Figure 3B:
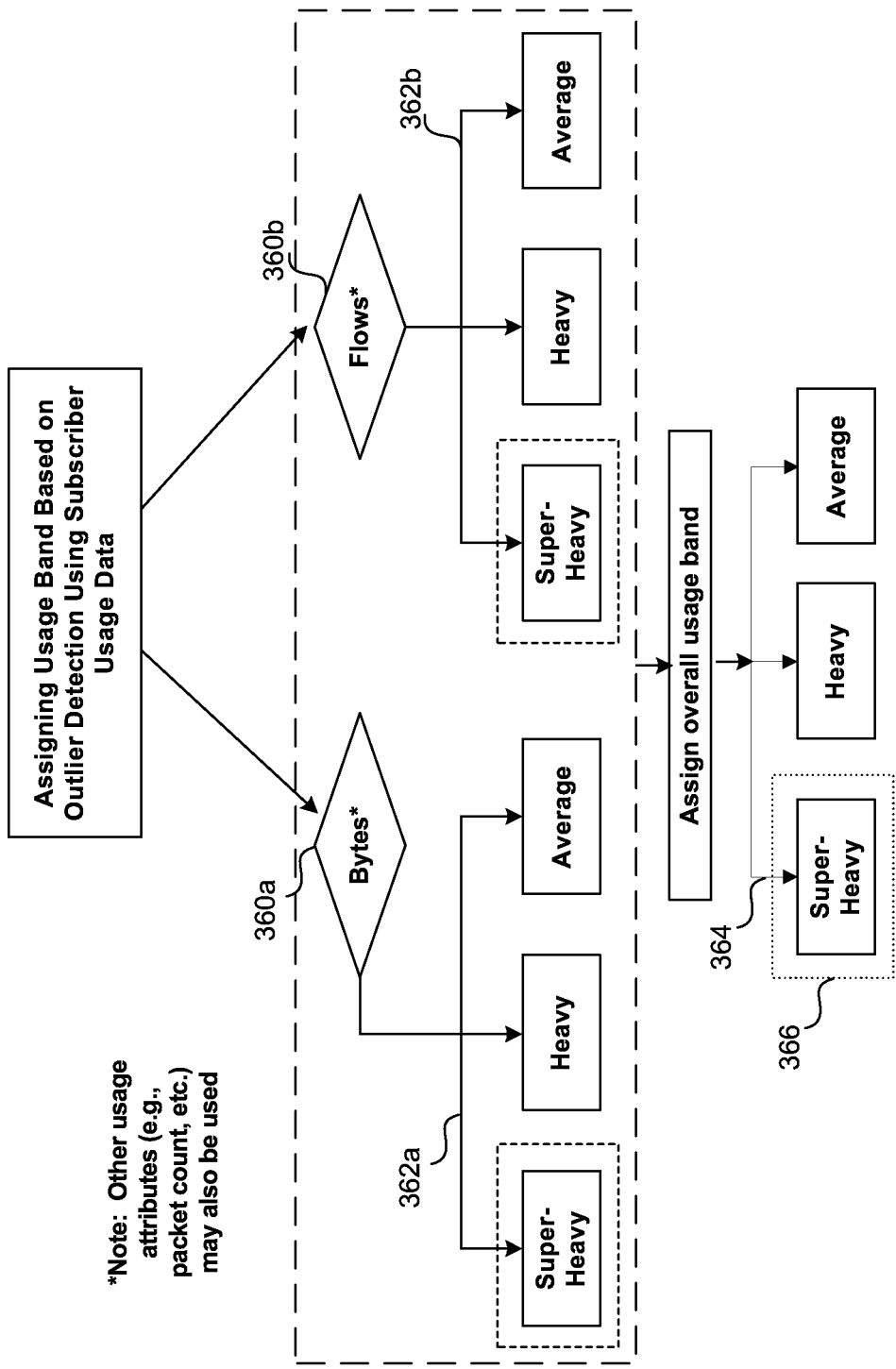
FIG. 3B illustrates a flow diagram of an example process for assigning an overall usage band in the subscriber fairness solution, according to an embodiment.

FIG. 3B illustrates a block diagram of an example process for assigning usage bands in the subscriber fairness solution, according to an embodiment of the present invention. The example process may be implemented in step 340 of FIG. 3A for assigning usage bands to a particular subscriber utilizing network resources. As illustrated in the embodiment of FIG. 3B, three usage bands 362a, 362b are defined (i.e., super-heavy, heavy, and average) for the attributes 360a, 360b (i.e., bytes and flows), respectively. In other embodiments, various combinations of usage bands (e.g., heavy, average, below average, etc.) may be defined to categorize the different types of subscribers utilizing the network resources. Referring to FIG. 3B, a cumulative (i.e., "final" or "overall") usage band 364 for a particular subscriber is defined by combining individual usage-band designations, that is, a usage-band designation based on byte count, such as the usage band 362a, and a usage-band designation based on flow count, such as usage band 362b. In the embodiment, the cumulative usage band assigned to the particular subscriber is the super-heavy band 366, deeming the subscriber to be a super-heavy user of network resources. The super-heavy band designation is a result of both individual usage band designations (i.e., 362a and 362b) designating the subscriber as a super-heavy user.

Figure 3C:
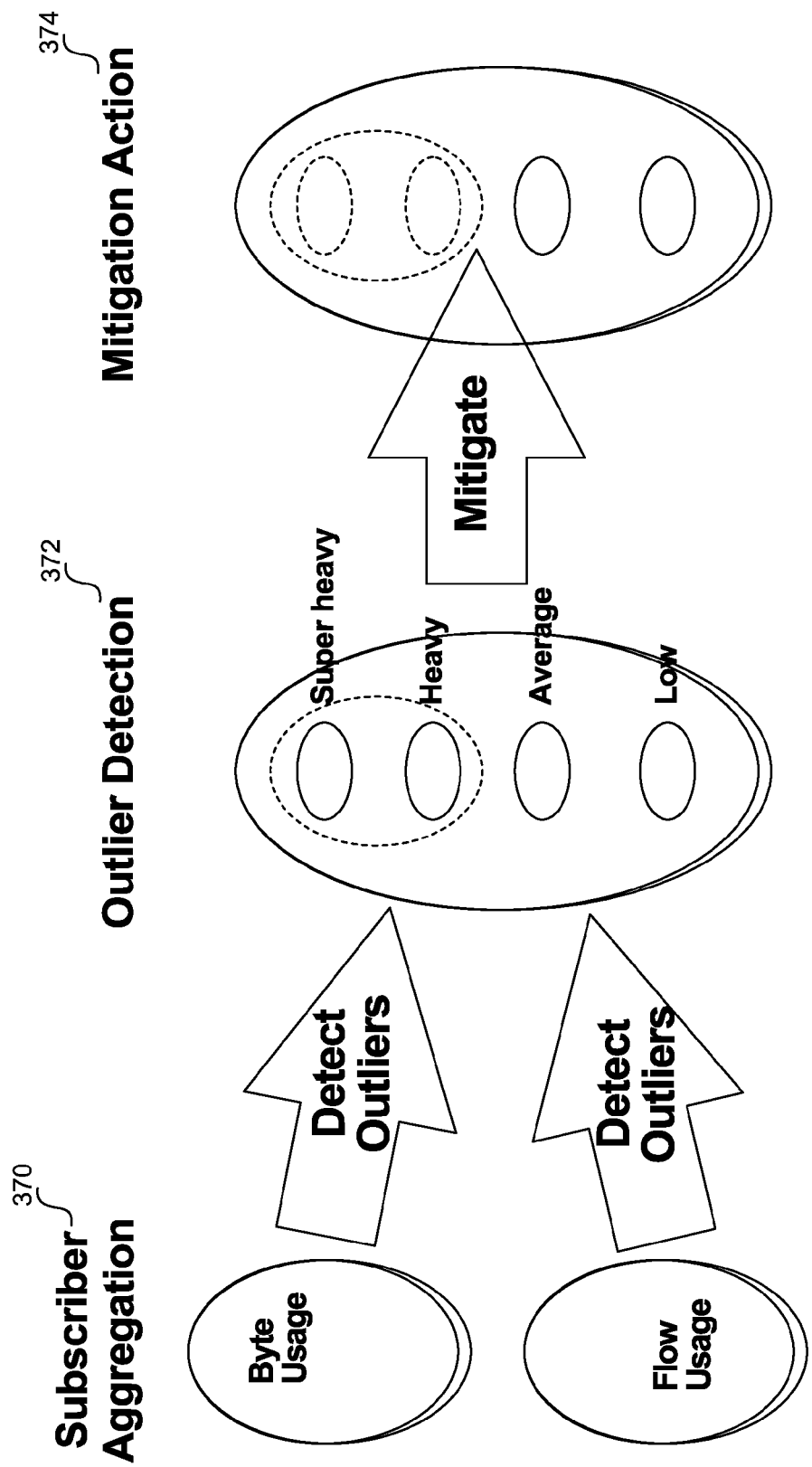
FIG. 3C illustrates an overall view of an example subscriber fairness solution, according to an embodiment.

FIG. 3C illustrates an overall view of the subscriber fairness solution, according to an embodiment of the present invention. FIG. 3C may be an overall, simplified view of the process of FIG. 3A. As illustrated, the process starts at aggregation of subscriber data 370. Detection of outlier(s) 372 is performed by using one or more outlier algorithms. In detecting the outliers, subscriber usage bands are assigned. Ultimately, a final (or overall) usage band is assigned based on the individual usage band designations. Application of a mitigating action may be performed on the outlier, if any. The mitigating action may be configured by the operator.

Figure 4A:
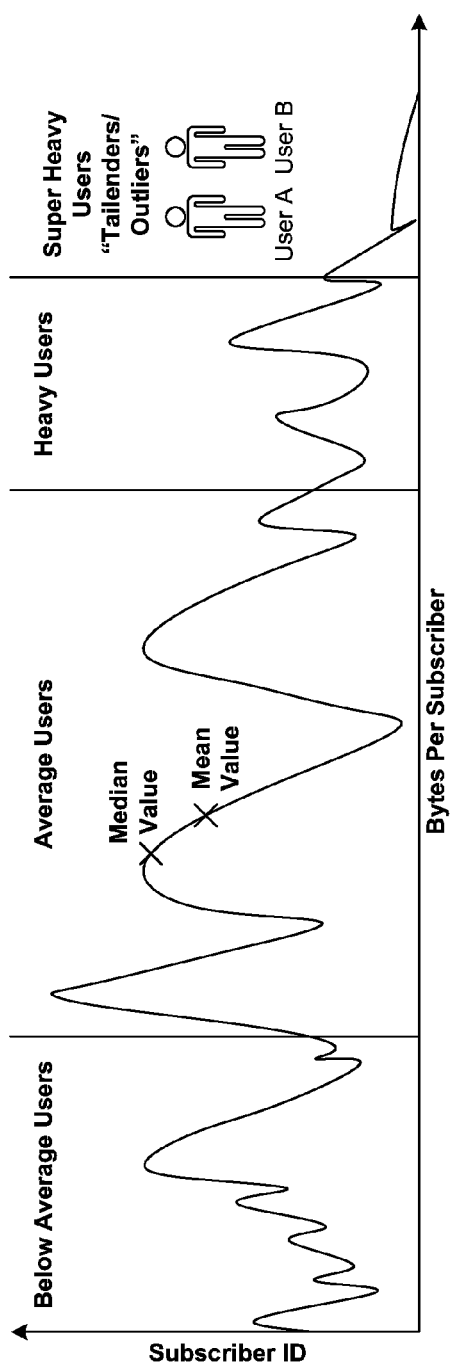
FIGS. 4A and 4B illustrate graphical depictions of example final or overall usage bands, according to an embodiment.
Figure 4B:
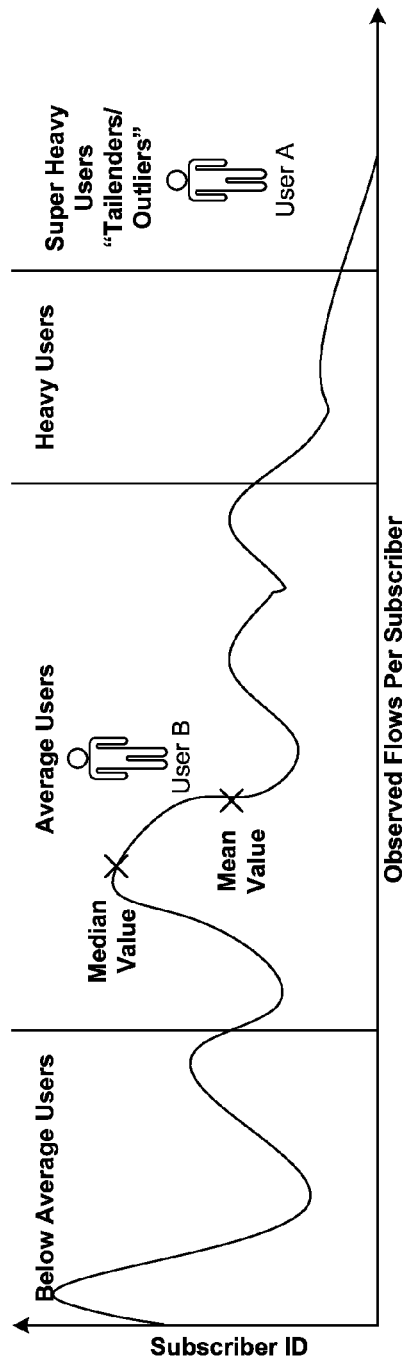

FIGS. 4A and 4B illustrate the final or overall usage bands that may be generated by tracking and analyzing individually the number of accumulated flows and bytes of two users, according to an embodiment of the present invention. As an example, consider a circumstance with user A and user B. User A occupies the network in bursts over a few days with peer-to-peer applications, and thus, accumulating a large number of bytes and a very large number of flows. In contrast, User B utilizes a steady flow of traffic over a long period of time with a VPN connection, and thus, accumulating a large number of bytes, but a relatively smaller number of flows. Referring to FIG. 4A, in an embodiment where only the historical byte-usage distribution is analyzed for user A and user B, respectively, both users are categorized as "super heavy users." On the other hand, referring to FIG. 4B, in an embodiment where only the historical flow distribution, instead of the historical byte-usage distribution, is analyzed, user A is classified as a "super heavy user" and user B as an "average user." As such, users may be categorized (i.e., assigned a usage band) differently based on the single attribute being analyzed. While such analysis, as embodied in FIGS. 4A-4B, uses the outlier detection logic technique of the present invention, only a one-dimensional view of users' traffic patterns is provided.

The present invention contemplates another embodiment that accounts for multiple attributes, instead of single attributes, so that a multi-dimensional view if the users' traffic patterns is enabled. In such embodiment, the system is able to discern the bandwidth-hungry applications used by user A from the legitimate applications used by user B. In particular, having statistical distributions on each of the individual attributes allows the subscriber fairness system to more finely separate the types of users, and to identify the real outliers causing strain on the network resources. When a combination of byte usage and number of flows is tracked in a given time period for each subscriber, a sense of the subscriber's overall patterns of usage may be gained for a better analysis. In embodiments, the outlier detection logic is applied for each time interval (e.g., very short term, short term, medium term, long term) and for each usage criteria (e.g., byte usage, number of flows) in order to derive a final subscriber usage band.

As previously discussed, a subscriber's usage history may be maintained for certain periods, such as a short-term period or a long-term period. The usage history of each subscriber can be associated with a specific usage band for each time period. For example, a subscriber's usage band may be considered super heavy over a short term, but average on a long-term basis. Further, the subscriber may be associated with a specific usage band according to the number of bytes accumulated or according to the number of flows seen. Ultimately, a cumulative usage band for the subscriber may be defined by combining individual usage-band designations. Use of cumulative usage patterns of the subscriber by combining several individual attribute patterns gives a good insight into the nature of applications used by the subscriber. This is a non-intrusive way to identify subscribers, using network-resource-straining applications, without the use of deep packet inspection (DPI). Such an insight into the subscriber application traffic without the use of invasive and expensive DPI techniques can prove to be extremely beneficial for the operator. Different subscribers may be treated differently (e.g., in terms of how their traffic is assigned a priority) based on the usage distributions of the subscriber and the overall usage band.

There are various ways to determine an overall usage band of a user based on the user's individual byte and flow usage bands. In one embodiment, a table or matrix may be used to define an overall usage band. Using such matrix, the subscriber fairness system may assign an overall user band for any combination of the designations assigned to the user's byte-usage band and the user's flow-usage band. Table 1 shows an example of how an overall usage band may be assigned from the individual byte and flow usage band designations.

TABLE 1

Overall usage band based on individual byte and flow usage bands.

| Byte usage band ($r_i^{byte}$) | Flow usage band ($r_i^{flow}$) | Overall Usage Band |
| --- | --- | --- |
| Super Heavy | Super Heavy or Heavy | Super Heavy |
| Super Heavy | Average or Below Average | Heavy |
| Heavy | Super Heavy | Super Heavy |
| Heavy | Heavy | Heavy |
| Average or Below Average | Average or Below Average | Average or Below Average |

In the example above, if the subscriber's byte-usage designation is "super-heavy" (i.e., assigned super-heavy byte-usage band) and the flow-accumulation, or flow-usage, designation is "super-heavy" or "heavy," the overall usage band for the subscriber may be assigned "super-heavy." Designation of "super-heavy" is appropriate because the activity of the subscriber is very heavy on all fronts. For example, when a subscriber uses (many) peer-to-peer applications that generate a lot of flows, in addition to a lot of bytes, the subscriber is determined to be an outlier in each usage band (i.e., byte band and flows band). As such, the subscriber is categorized as a "super-heavy" user. If the subscriber's byte-usage is "super heavy" and flow-usage is "average" or "below-average," the overall usage band for the subscriber may be assigned as "heavy." Designation of "heavy" is appropriate because the flow-usage appears to indicate a legitimate application. As such, the subscriber's activity should not be penalized as much. For example, where a subscriber utilizes a VPN connection from home, the number of flows is deemed average while the byte count may fall in the outlier range. As such, the subscriber may be treated differently than the other subscriber, whose streaming traffic puts a strain on the network.

If the byte-usage band is "heavy" and the flow-usage band is "super heavy," the overall usage band may be assigned as "super heavy." This designation is appropriate because the combination of "heavy" byte usage band and "super-heavy" flow usage band appears to, or tends to, indicate suspicious activity. If the byte-usage band and flow-usage band are both "heavy," the overall usage band may be assigned as "heavy" until additional subscriber history is known. Lastly, if the byte-usage band and the flow-usage band are both deemed "average" or "below average," the subscriber fairness system may assign the overall usage band as "average" or "below-average." In some embodiments, only three usage bands are defined (e.g., heavy, average, below average). In other embodiments, various combinations of usage bands (e.g., four usage bands, two usage bands, etc.) may be defined to classify the different types of subscribers utilizing the network resources.

Figure 5:
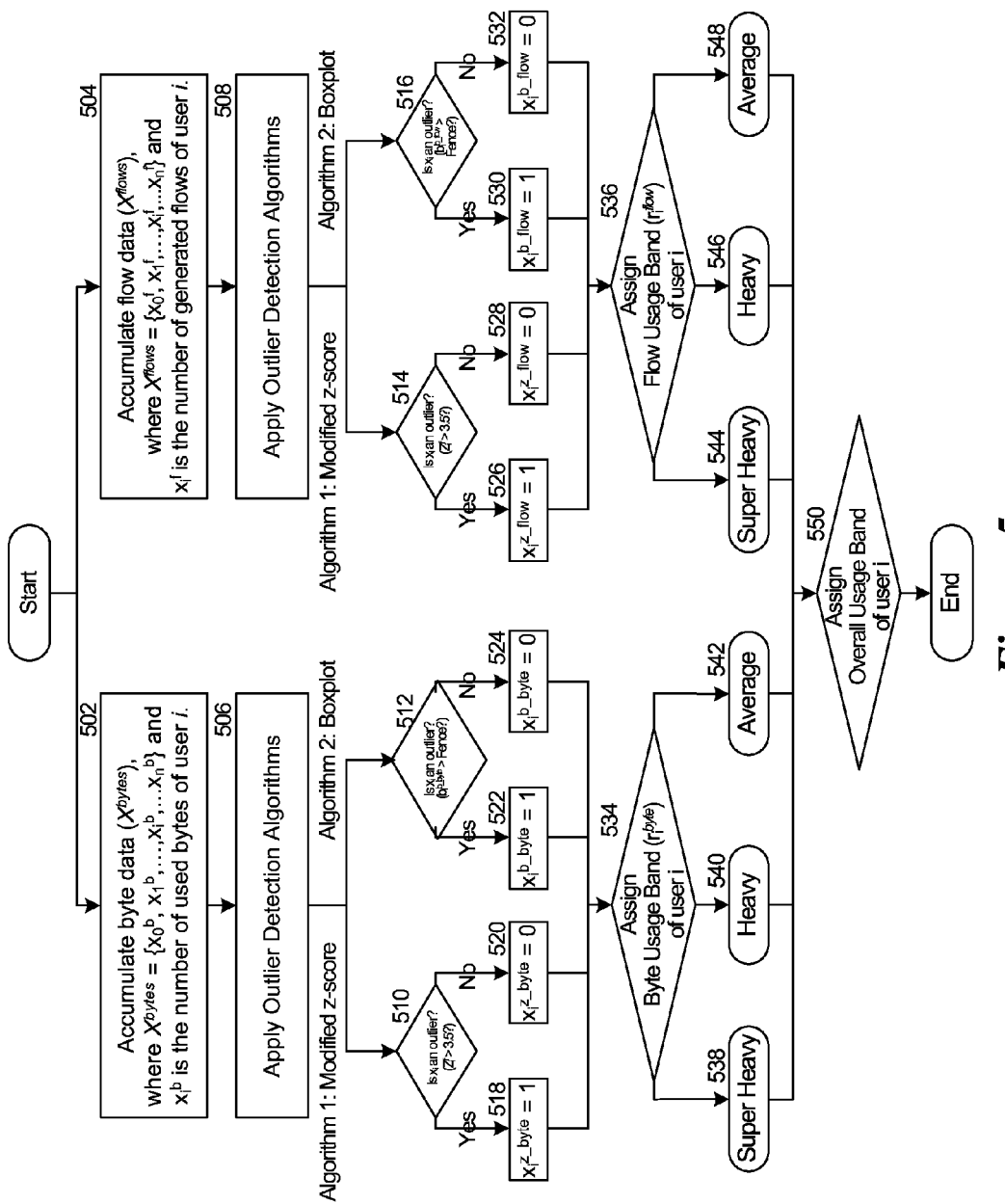
FIG. 5 depicts a flow diagram of an example detailed process for assigning an overall usage band using outlier detection logic, according to an embodiment.

FIG. 5 depicts a flow diagram illustrating an example detailed process for assigning an overall usage band using outlier detection logic, according to an embodiment of the present invention. At steps 502 and 504, the system begins the process of determining the individual usage bands by accumulating respectively, byte ($X^{bytes}$) and flow data ($X^{flows}$) of users (i.e., n users) for a given time period. Those skilled in the art will appreciate that the steps may be altered in a variety of ways. For example, the steps may be rearranged or performed in parallel, some steps omitted, and additional steps may be included. Additionally, other subscriber usage attributes, such as packet count, for example, may be used.

At step 502, the system determines $X^{bytes} = \{x_0^b, x_1^b, \ldots, x_i^b, \ldots, x_n^b\}$, which takes into account the number of used bytes for each user i, for users from 1 to n. At step 504, the system determines $X^{flows} = \{x_0^f, x_1^f, \ldots, x_i^f, \ldots, x_n^f\}$, which takes into account the number of generated flows for each user i, for users from 1 to n.

At steps 506 and 508, an outlier detection logic is applied to the byte and flow data. In embodiments, the outlier detection logic may utilize any number of statistical outlier detection algorithms at steps 506 and 508 to identify outliers. The statistical outlier detection algorithms may be, for example, those discussed above including standard deviation, Z-score, $MAD_e$, and the like. As shown in FIG. 5, the modified Z-score and boxplot (or Tukey's) algorithms are used to identify outliers, according to the one embodiment.

At step 510, under the modified Z-score algorithm for analyzing $X^{bytes}$ a modified Z-score ($z_i^b$) for bytes is compared to a predetermined threshold of 3.5 (i.e., a value known as the standard threshold value in the art). If the modified Z-score is greater than the predetermined threshold, the process proceeds to step 518 where $x_i^{z\_byte}=1$, indicating that the user is an outlier based on byte usage using modified Z-score algorithm. Otherwise, the process proceeds to step 520 where $x_i^{z\_byte}=0$. At step 512, under the boxplot algorithm for analyzing $X^{bytes}$, the system determines if $b_i^{b\_byte}>Fence_{to}$. If $b_i^{b\_byte}>Fence_{to}$, the process proceeds to step 522 where $x_i^{b\_byte}=1$, indicating that the user is an outlier based on byte usage using Box plot algorithm. Otherwise, the process proceeds to step 520 where $x_i^{b\_byte}=0$.

At steps 514 and 516, similar processes occur where the outlier detection logic, utilizing the one or more statistical outlier detection algorithms, is applied to the flow data. In one embodiment, the modified Z-score and boxplot algorithms are used to identify the outliers. At step 514, under the modified Z-score algorithm for analyzing $X^{flows}$, a modified Z-score ($z_i^f$) for flows is compared to a predetermined threshold of 3.5 (i.e., a value known as the standard threshold value in the art). If the modified Z-score is greater than the predetermined threshold, the process proceeds to step 526 where $x_i^{z\_flow}=1$, indicating the user is an outlier based on flow usage using modified Z-score algorithm. Otherwise, the process proceeds to step 528 where $x_i^{z\_flow}=0$. At step 516, under the boxplot algorithm for analyzing $X^{flows}$, the system determines if $b_i^{b\_flow}>Fence_{to}$. If $b_i^{b\_flow}>Fence_{to}$, the process proceeds to step 530 where $x_i^{b\_flow}=1$, indicating user is an outlier based on flow usage using box plot algorithm. Otherwise, the process proceeds to step 532 where $x_i^{b\_flow}=0$.

At steps 534 and 536, a byte usage band ($r_i^{byte}$) and flow usage band ($r_i^{flow}$) for each user i is assigned. Those skilled in the art will appreciate that usage bands may be assigned in a variety of ways. In one embodiment, if $x_i^{z\_byte}=1$ and $x_i^{b\_byte}=1$, then the byte usage band ($r_i^{byte}$) of user i is deemed "super heavy." Further, if $x_i^{z\_byte}=0$ and $x_i^{b\_byte}=0$, the byte usage band ($r_i^{byte}$) of user i is deemed "average." The byte usage band ($r_i^{byte}$) of user i is deemed "heavy" if: (a) $x_i^{z\_byte}=1$ and $x_i^{b\_byte}=0$ or (b) $x_i^{z\_byte}=0$ and $x_i^{b\_byte}=1$. Similarly for the flow usage band ($r_i^{flow}$), if $x_i^{z\_flow}=1$ and $x_i^{b\_flow}=1$, then the flow usage band is deemed "super heavy." Further, if $x_i^{z\_flow}=0$ and $x_i^{b\_flow}=0$, the byte usage band ($r_i^{flown}$) of user i is deemed "average." The flow usage band ($r_i^{flow}$) of user i is deemed "heavy" if either: (a) $x_i^{z\_flow}=1$ and $x_i^{b\_flow}=0$, or (b) $x_i^{z\_flow}=0$ and $x_i^{b\_flow}=1$.

As illustrated in FIG. 5, multiple outlier detection algorithms (e.g., Modified Z-Score and Boxplot) may be used by the outlier detection logic in order to reduce erroneous detection. For example, for the given byte attribute, as illustrated in step 502 of FIG. 5, if both the Modified Z-Score and the Boxplot algorithms classify a particular subscriber as an outlier, then the particular subscriber is considered a super heavy user with respect to that given attribute. On the other hand, if only one of the statistical outlier detection algorithms (e.g., only the Modified Z-Score or only the Boxplot) classifies the particular subscriber as an outlier, then that particular subscriber is considered only a heavy user. A sample categorization across various statistical outlier detection algorithms will be discussed in further detail in FIG. 6.

At step 550, an overall usage band of user i is assigned. Those skilled in the art will appreciate that usage bands may be assigned in a variety of ways. In some embodiments, the table or matrix shown in Table 1 is used to define the overall usage band. In other embodiments, other schemes are used to designate an overall usage band.

Additionally at step 550, a mitigating action may be applied to the subscriber. Referring back to step 350 of FIG. 3A, after the system determines the overall usage band of a particular subscriber, the system applies the mitigating action based, at least in part, on the overall usage band designation. The mitigating action taken by the subscriber fairness system can be based on configuration preferences. For example, at the end of every time interval (e.g., a short term, medium, or long term period), the heavy users are identified and a mitigating action is taken. Further, the mitigating action may be configured to proactively or reactively mitigate the congestion. Proactive mitigating action may be taken when no resource strain has yet been detected, and when the statistical distribution has merely identified several heavy users/outliers. Reactive mitigating action may be taken when the link is actually congested or nearing capacity. Moreover, the usage history of a subscriber and statistical distribution may be used to determine which users to penalize, such as super heavy users or heavy users. After identifying the target users, a mitigating action may be configured to determine what actions should be taken on such users.

Figure 6:
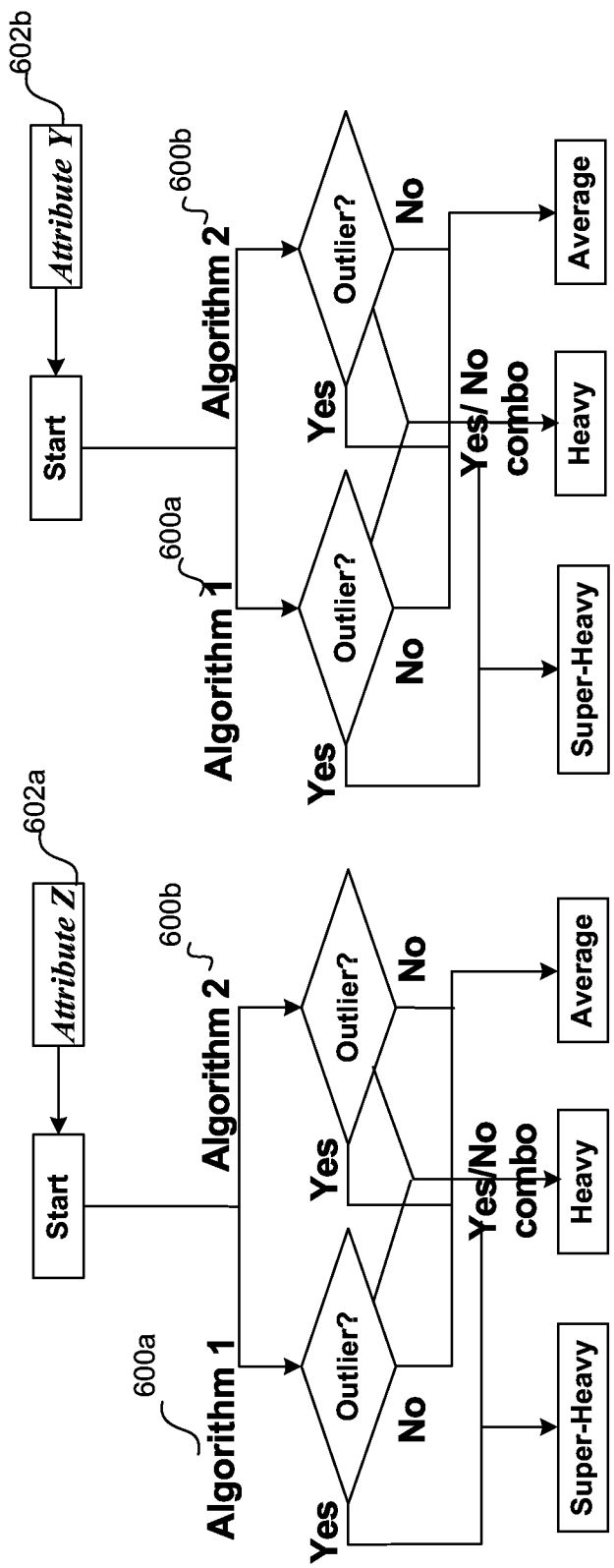
FIG. 6 illustrates a sample categorization across a plurality of statistical outlier detection algorithms for determining usage bands, according to an embodiment.

FIG. 6 illustrates a sample categorization across a plurality of statistical outlier detection algorithms for determining individual usage bands, according to an embodiment of the present invention. It is noted that any combination of the statistical outlier detection algorithms may be used in the outlier detection logic. Referring to FIG. 6, "algorithm 1" 600a and "algorithm 2" 600b and their individual results 604a, 604b with respect to each attribute 602a, 602b are utilized to derive a combination result 606. The combination result is an indication of whether a particular user (i.e., subscriber) is an outlier with respect to the specific attribute analyzed. The combination result 606 may be utilized to assign an individual usage band with respect to the specific attribute.

As illustrated in FIG. 6, using "attribute Z" 602a as the specific attribute, a specific user may have a different combination result 606 depending on the individual results 604a, 604b associated with the algorithms 600a, 600b. In one instance, the specific user is categorized as a "super heavy user" in the combination result 606, with respect to attribute Z, if both algorithms 600a, 600b indicate "YES" that the specific user is an outlier. In another instance, that same user is categorized as a "heavy user" in the combination result 606, with respect to attribute Z, when only one of the algorithms (i.e., when only one individual result) determines that the specific user is an outlier. In some embodiments, the combination result 606 of each attribute, may be combined to generate a final result. In embodiments, the final result indicates whether a particular user is an outlier with respect to the overall usage of the network resources. For example, the final result is an overall usage-band assigned to the user, based on the combination of attribute Z and Y.

In embodiments, the multiple algorithms (e.g., 600a, 600b) may be used in many different ways to determine the combination result 606 for the user with respect to each specific attribute. In some embodiments, an equal weightage may be given for the algorithms. In other embodiments, a different weightage may be given based on, for example, the accuracy of the specific algorithm. The different weightage may affect how the various individual usage bands (or combination results) are determined.

Figure 7:
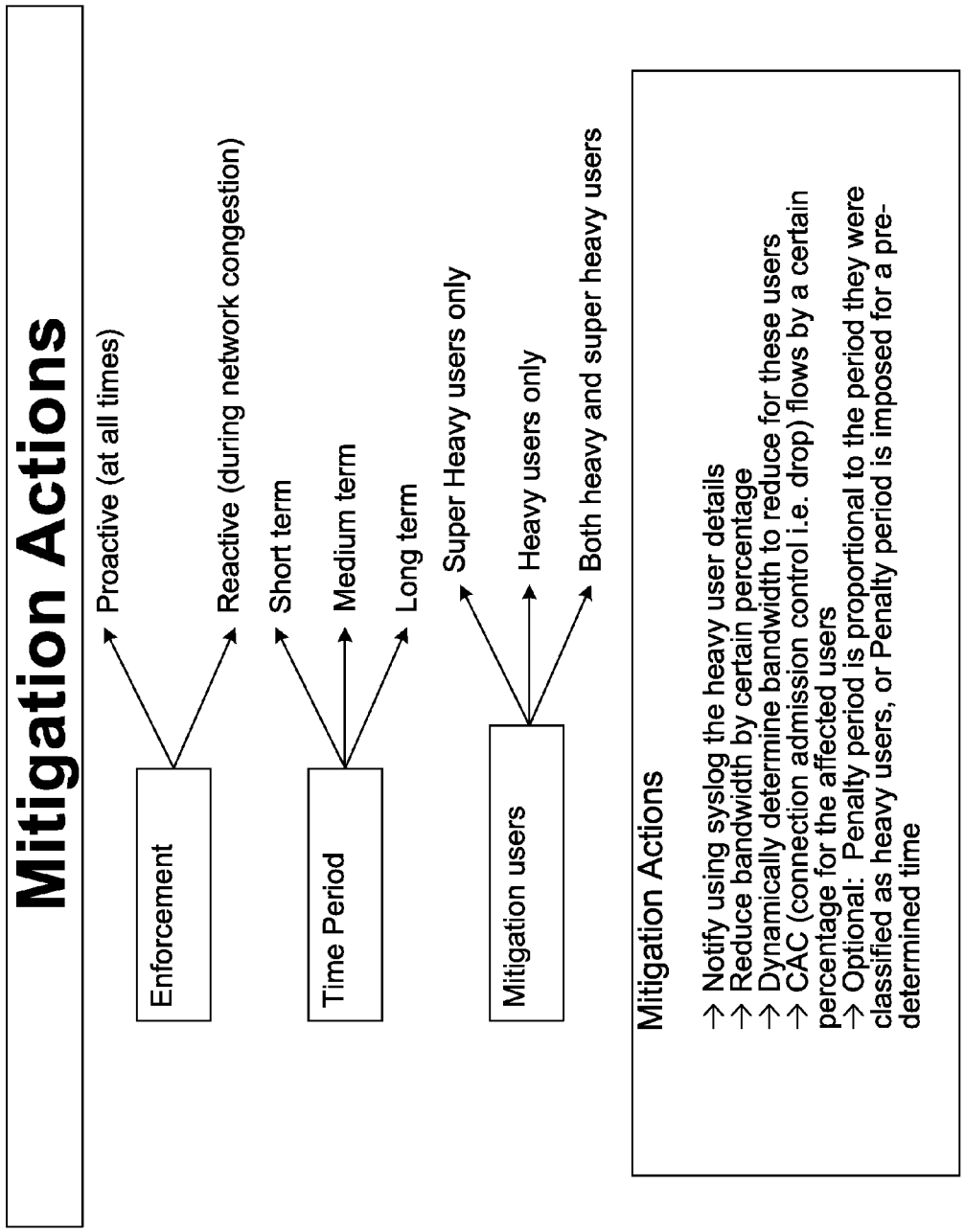
FIG. 7 illustrates a plurality of mitigating actions for ensuring subscriber fairness, according to an embodiment.

FIG. 7 illustrates a plurality of mitigating actions according to an embodiment of the present invention. These mitigating actions may be implemented to ensure subscriber fairness in one or more embodiments of the present invention. The mitigating actions may include, but are not limited to, notifying the heavy users of possible remedial measures or penalizing the subscriber's usage. For example, the subscriber's bandwidth may be reduced by a certain percentage as a penalty. Further, the system can dynamically determine the amount of bandwidth to reduce for these users. As another example, a median fair rate can be established from the statistical distribution or the outlier detection method and then based on the congestion caused by the heavy user, a predetermined percentage of packets or flows may be dropped.

Other mitigating actions include imposing on the heavy user a penalty period that is set to a predetermined time or that is proportional to the period that the subscriber was classified as a heavy user. As such, a set of mitigating actions may be configured for the heaviest users with differing time periods. For example, one set of mitigating actions may be not taking action for a short-term heavy user and sending a notification to a long-term heavy user. Another example of a set of mitigating actions may be sending a notification to a short-term heavy user while reducing a predetermined percentage of bandwidth for a long-term heavy user.

Further, the system can configure the extent to which the mitigating action is enforced. For example, an operator can configure whether the mitigation is enforced at all times or only during congestion. In one embodiment, the system may notify a subscriber at all times for a short-term heavy user. In a further or alternative embodiment, the system may reduce the bandwidth of a long-term heavy user only during congestion, but notify at all other times. In another embodiment, mitigating action includes the ability of the operator to customize the policies to flexibly allow a range of actions.

In turn, the subscriber fairness solution offers flexibility to support a variety of fairness models and can be configured by administrators to adhere to the fairness model which best fits their definition of user fairness. Moreover, the outlier detection methods are based on statistical distribution models running in the background that dynamically define the outlier thresholds for various attributes. Thus, with minimal configuration, the subscriber fairness platform can operate as a plug-and-play solution. Further, subscriber fairness solution makes use of multiple attribute statistical distributions to make fine-grained distinctions between legitimate application users from bandwidth-hungry users, and precludes the need for DPI mechanisms.

While a subscriber fairness solution is herein described as operating on a flow-state basis, the subscriber fairness solution is not limited to this platform and can be adapted for other platforms, including legacy systems (e.g., legacy routers).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this patent application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed:

1. A method for detecting outlier users of a network resource comprising:
    monitoring stream data associated with a subscriber's usage of a network resource for a predetermined time interval;
    deriving, from the stream data, a flow-count history, where a flow is a communicative connection between a particular source IP address and transport layer port to a particular destination IP address and transport layer port in which all of the packets are using the same protocol, and a flow-count history is a count of the number of flows the subscriber initiates as either the source IP address or destination IP address during a predetermined time period;
    deriving, from the stream data, byte data associated with the subscriber's usage of the network resource for the predetermined time interval for developing a byte-usage history;
    applying an outlier detection logic to the byte-usage history as compared to a plurality of other byte-usage histories associated with a plurality of other subscribers;
    assigning a byte-usage band to the subscriber based on the outlier detection logic as applied to the byte-usage history;
    applying the outlier detection logic to the flow-count history as compared to a plurality of other flow-count histories associated with a plurality of other subscribers;
    assigning a flow-count band to the subscriber based on the outlier detection logic as applied to the flow-count history;
    assigning an overall usage-band to the subscriber based on the byte-usage band assigned and the flow-count band assigned; and
    applying a mitigating action to the subscriber based on the overall usage-band assigned.

2. The method of claim 1, wherein the outlier detection logic includes two or more outlier detection algorithms.

3. The method of claim 2, wherein:
    the byte-usage band assigned is at least one of: a super-heavy byte-usage band, a heavy byte-usage band, an average byte-usage band, or a below-average byte-usage band; and
    the flow-count band assigned is at least one of: a super-heavy flow-count band, a heavy flow-count band, an average flow-count band, or a below-average flow-count band.

4. The method of claim 3, wherein the average byte-usage band is assigned to the subscriber if each of the two or more outlier detection algorithms determines there is no anomalous subscriber usage in the byte-usage history.

5. The method of claim 3, wherein the average flow-count band is assigned to the subscriber if each of the two or more outlier detection algorithms determines there is no anomalous subscriber usage in the flow-count history.

6. The method of claim 3, wherein assigning the overall usage band to the subscriber further includes:
    assigning the overall usage band as a super heavy overall usage band if the byte-usage band assigned is a super-heavy byte-usage band and the flow-count band assigned is a super-heavy flow-count band or a heavy flow-count band;
    assigning the overall usage-band as a heavy overall usage band if the byte-usage band assigned is a super heavy byte-usage band and the flow-count band assigned is an average flow-count band or a below-average flow-count band;
    assigning the overall usage-band as a super-heavy overall usage-band if the byte-usage band assigned is a heavy byte-usage band and the flow-count band assigned is a super-heavy flow-count band;
    assigning the overall usage-band as a heavy overall usage-band if the byte-usage band assigned is a heavy byte-usage band and the flow-count band assigned is a heavy flow-count band; and
    assigning the overall usage-band as an average overall usage-band if the byte-usage band assigned is an average byte-usage band or a below-average byte-usage band and the flow-count band assigned is an average flow-count band or a below-average flow-count band.

7. The method of claim 2, wherein the two or more outlier detection algorithms include a modified Z-score algorithm and a box plot algorithm.

8. The method of claim 2, wherein the two or more outlier detection algorithms include at least one of: a standard deviation algorithm, a Z-score algorithm, a modified Z-score algorithm, a box plot algorithm, a $MAD_e$ algorithm.

9. The method of claim 6, wherein applying the mitigating action includes:
    applying a first mitigating action to the subscriber if the subscriber is assigned the heavy overall usage band or the super-heavy overall usage band for a time less than or equal to the predetermined time interval; and
    applying a second mitigating action to the subscriber if the subscriber is assigned the heavy overall usage band or the super-heavy overall usage band for a time more than the predetermined time interval.

10. The method of claim 6, wherein applying the mitigating action includes:
configuring a first mitigating action for the subscriber if the subscriber is assigned the heavy overall usage band or the super-heavy overall usage band; and
configuring a second mitigating action for the subscriber if the subscriber is assigned the average overall usage band or the below-average overall usage band.

11. A system for detecting outlier users of a network resource comprising:
a processor;
a packet processing module instantiated on the system, coupled to the processor, which operates to:
track aggregate byte-usage data for a subscriber; and
track flow data of the subscriber, for a predetermined time interval, where a flow is a communicative connection between a particular source IP address and transport layer port to a particular destination IP address and transport layer port in which all of the packets are using the same protocol, to develop a flow-count history, where a flow-count history is a count of the number of flows the subscriber initiates as either the source IP address or destination IP address during a predetermined time period; and
a bulk statistics record (BSR) module instantiated on the system which operates to:
apply an outlier detection logic to the byte-usage history as compared to a plurality of other byte-usage histories associated with a plurality of other subscribers;
assign a byte-usage band to the subscriber based on the outlier detection logic as applied to the byte-usage history;
apply the outlier detection logic to the flow-count history as compared to a plurality of other flow-count histories associated with a plurality of other subscribers;
assign a flow-count band to the subscriber based on the outlier detection logic as applied to the flow-count history;
assign an overall usage-band to the subscriber based on the byte-usage band assigned and the flow-count band assigned; and
apply, by the network resource, a mitigating action to the subscriber concerning the subscriber's access to the network resource based on the overall usage-band assigned.

12. The system of claim 11, wherein the outlier detection logic includes two or more outlier detection algorithms.

13. The system of claim 12, wherein:
the byte-usage band assigned is at least one of: super-heavy, heavy, average, or below-average; and
the flow-count band assigned is at least one of: super-heavy, heavy, average, or below-average.

14. The system of claim 13, wherein the average byte-usage band is assigned to the subscriber if each of the two or more outlier detection algorithms determines there is no anomalous subscriber usage in the byte-usage history, and wherein the average flow-count band is assigned to the subscriber if each of the two or more outlier detection algorithms determines there is no anomalous subscriber usage in the flow-count history.

15. The system of claim 13, wherein the average flow-count band is assigned to the subscriber if each of the two or more outlier detection algorithms determines there is no anomalous subscriber usage in the flow-count history.

16. The system of claim 13, wherein the BSR module further operates to:
assign the overall usage band as super-heavy when the byte-usage band assigned is super heavy and the flow-count band assigned is super heavy or heavy;
assign the overall usage-band as heavy when the byte-usage band assigned is super heavy and the flow-count band assigned is average or below average;
assign the overall usage-band as super heavy when the byte-usage band assigned is heavy and the flow-count band assigned is super heavy;
assign the overall usage-band as heavy when the byte-usage band assigned is heavy and the flow-count band assigned is heavy; and
assign the overall usage-band as average when the byte-usage band assigned is average or below average and the flow-count band assigned is average or below average.

17. The system of claim 12, wherein the two or more outlier detection algorithms includes a modified Z-score algorithm and a box plot algorithm.

18. The system of claim 12, wherein the two or more outlier detection algorithms includes at least one of: a standard deviation algorithm, a Z-score algorithm, a modified Z-score algorithm, an adjusted box plot algorithm, a $MAD_e$ algorithm.

19. The system of claim 16, wherein applying the mitigating action further includes:
applying a first mitigating action to the subscriber if the subscriber is assigned the heavy overall usage band or the super-heavy overall usage band for a time less than or equal to the predetermined time interval; and
applying a second mitigating action to the subscriber if the subscriber is assigned the heavy overall usage band or the super-heavy overall usage band for a time more than the predetermined time interval.

20. The system of claim 16, wherein applying the mitigating action further includes:
configuring a first mitigating action for the subscriber if the subscriber is assigned the heavy overall usage band or the super-heavy overall usage band; and
configuring a second mitigating action for the subscriber if the subscriber is assigned the average overall usage band or the below-average overall usage band.

21. A method for detecting outlier users of a network resource comprising:
aggregating flow data of a subscriber for a plurality of time intervals, where a flow is a communicative connection between a particular source IP address and transport layer port to a particular destination IP address and transport layer port in which all of the packets are using the same protocol, for developing a flow-count pattern, and a flow-count pattern is a count of the number of flows the subscriber initiates as either the source IP address or destination IP address during a predetermined time period;
applying an outlier detection logic to the flow-count pattern as compared to a plurality of other flow-count patterns associated with a plurality of other subscribers;
assigning a flow-count band to the subscriber based on a first result of the outlier detection logic;
aggregating byte data of the subscriber for the plurality of time intervals for developing a byte-usage pattern;

applying the outlier detection logic to the byte-usage pattern as compared to a plurality of other byte-usage patterns associated with a plurality of other subscribers;

assigning a byte-usage band to the subscriber based on a second result of the outlier detection logic;

assigning an overall usage-band to the subscriber based on the flow-count band assigned and the byte-usage band assigned; and applying, by the network resource, a mitigating action to the subscriber concerning the subscriber's access to the network resource based on the overall usage-band assigned.

22. The method of claim 21, wherein the outlier detection logic includes an outlier detection algorithm.

23. The method of claim 22, wherein the outlier detection algorithm comprises at least one of: a standard deviation algorithm, a Z-score algorithm, a modified Z-score algorithm, a box plot algorithm, or a $MAD_e$ algorithm.

24. The method of claim 22, wherein:
the byte-usage band assigned is at least one of: a super-heavy byte-usage band, a heavy byte-usage band, an average byte-usage band, or a below-average byte-usage band; and
the flow-count band assigned is at least one of: a super-heavy flow-count band, a heavy flow-count band, an average flow-count band, or a below-average flow-count band.

25. The method of claim 24, wherein the average flow-count band is assigned to the subscriber if the first result does not exceed a predetermined flow threshold, and wherein the average byte-usage band is assigned to the subscriber if the second result does not exceed a predetermined byte threshold.

26. The method of claim 24, wherein the heavy flow-count band is assigned to the subscriber if the first result does not exceed a predetermined flow threshold.

27. The method of claim 24, wherein assigning the overall usage band to the subscriber further includes:
assigning the overall usage band as a super-heavy overall usage band when the byte-usage band assigned is the super-heavy byte-usage band and the flow-count band assigned is the super-heavy flow-count band or the heavy flow-count band;
assigning the overall usage-band as a super-heavy overall usage band when the byte-usage band assigned is the heavy byte-usage band and the flow-count band assigned is the super-heavy flow-count band;
assigning the overall usage-band as a heavy overall usage-band when the byte-usage band assigned is the heavy byte-usage band and the flow-count band assigned is the heavy flow-count band; and
assigning the overall usage-band as an average overall usage-band when the byte-usage band assigned is the average byte-usage band or the below-average byte-usage band and the flow-count band assigned is the average flow-count band or the below average flow-count band.

28. The method of claim 27, wherein applying the mitigating action includes:
applying a first mitigating action to the subscriber if the subscriber is assigned the heavy overall usage band or the super heavy overall usage band for a time less than or equal to a predetermined time; and
applying a second mitigating action to the subscriber if the subscriber is assigned the heavy overall usage band or the super-heavy overall usage band for a time more than the predetermined time.

29. The method of claim 27, wherein applying the mitigating action includes:
configuring a first mitigating action for the subscriber if the subscriber is assigned the heavy overall usage band or the super heavy overall usage band; and
configuring a second mitigating action for the subscriber if the subscriber is assigned the average overall usage band or the below average overall usage band.

30. A system for detecting outlier users of a network resource comprising:
means for aggregating flow data, of a subscriber for a plurality of time intervals, where a flow is a communicative connection between a particular source IP address and transport layer port to a particular destination IP address and transport layer port in which all of the packets are using the same protocol, for developing a flow-count pattern, and a flow-count pattern is a count of the number of flows the subscriber initiates as either the source IP address or destination IP address during a predetermined time period;
means for applying an outlier detection logic to the flow-count pattern as compared to a plurality of other flow-count patterns associated with a plurality of other subscribers;
means for assigning a flow-count band to the subscriber based on a first result of the outlier detection logic;
means for aggregating byte data of the subscriber for the plurality of time intervals for developing a byte-usage pattern;
means for applying the outlier detection logic to the byte-usage pattern as compared to a plurality of other byte-usage patterns associated with a plurality of other subscribers;
means for assigning a byte-usage band to the subscriber based on a second result of the outlier detection logic; and
means for assigning an overall usage-band to the subscriber based on the flow-count band assigned and the byte-usage band assigned.

31. The system of claim 30, wherein the outlier detection logic includes a statistical outlier detection algorithm.

32. The system of claim 31, wherein the statistical outlier detection algorithm includes at least one of: a standard deviation algorithm, a Z-score algorithm, a modified Z-score algorithm, a box plot algorithm, or a $MAD_e$ algorithm.

33. The system of claim 31, wherein:
the byte-usage band assigned is at least one of: a super-heavy byte-usage band, a heavy byte-usage band, an average byte-usage band, or a below-average byte-usage band; and
the flow-count band assigned is at least one of: a super-heavy flow-count band, a heavy flow-count band, an average flow-count band, or a below-average flow-count band.

34. The system of claim 33, wherein means for assigning the overall usage band to the subscriber further includes:
means for assigning the overall usage band as a super-heavy overall usage band when the byte-usage band assigned is the super-heavy byte-usage band and the flow-count band assigned is the super-heavy flow-count band or the heavy flow-count band;
means for assigning the overall usage-band as a super-heavy overall usage band when the byte-usage band assigned is the heavy byte-usage band and the flow-count band assigned is the super-heavy flow-count band;

means for assigning the overall usage-band as a heavy overall usage-band when the byte-usage band assigned is the heavy byte-usage band and the flow-count band assigned is the heavy flow-count band; and means for assigning the overall usage-band as an average overall usage-band when the byte-usage band assigned is the average byte-usage band or the below-average byte-usage band and the flow-count band assigned is the average flow-count band or the below average flow-count band.

35. The system of claim 34, further including:

means for applying a mitigating action to the subscriber concerning the subscriber's access to the network resource based on the overall usage-band assigned.

36. The system of claim 35, wherein means for applying the mitigating action further includes:

means for applying a first mitigating action to the subscriber if the subscriber is assigned the heavy overall usage-band or the super heavy overall usage-band for a time less than or equal to a predetermined time; and means for applying a second mitigating action to the subscriber if the subscriber is assigned the heavy overall usage-band or the super-heavy overall usage-band for a time more than the predetermined time.

37. The system of claim 35, wherein means for applying the mitigating action further includes:

means for configuring a first mitigating action for the subscriber if the subscriber is assigned the heavy overall usage-band or the super heavy overall usage-band; and means for configuring a second mitigating action for the subscriber if the subscriber is assigned the average overall usage-band or the below average overall usage-band.

* * * * *